United States Patent
Iwata et al.

(10) Patent No.: US 10,882,245 B2
(45) Date of Patent: Jan. 5, 2021

(54) METHOD OF MANUFACTURING THREE-DIMENSIONAL OBJECT, LIQUID SET FOR MANUFACTURING THREE-DIMENSIONAL OBJECT, DEVICE FOR MANUFACTURING THREE-DIMENSIONAL OBJECT, AND GEL OBJECT

(71) Applicants: Hiroshi Iwata, Kanagawa (JP);
Yoshihiro Norikane, Kanagawa (JP);
Takashi Matsumura, Kanagawa (JP);
Tatsuya Niimi, Kanagawa (JP);
Hiroyuki Naito, Tokyo (JP)

(72) Inventors: Hiroshi Iwata, Kanagawa (JP);
Yoshihiro Norikane, Kanagawa (JP);
Takashi Matsumura, Kanagawa (JP);
Tatsuya Niimi, Kanagawa (JP);
Hiroyuki Naito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 328 days.

(21) Appl. No.: 15/194,934

(22) Filed: Jun. 28, 2016

(65) Prior Publication Data
US 2017/0008228 A1 Jan. 12, 2017

(30) Foreign Application Priority Data

Jul. 6, 2015 (JP) .................................. 2015-135174
Jul. 22, 2015 (JP) .................................. 2015-145139
(Continued)

(51) Int. Cl.
*B29C 64/112* (2017.01)
*B29C 64/129* (2017.01)
(Continued)

(52) U.S. Cl.
CPC .......... *B29C 64/112* (2017.08); *B29C 64/129* (2017.08); *B29C 64/40* (2017.08);
(Continued)

(58) Field of Classification Search
CPC ......... B33Y 80/00; B33Y 30/00; B33Y 50/02; B33Y 70/00; B33Y 10/00; B29C 67/007;
(Continued)

(56) References Cited

U.S. PATENT DOCUMENTS 6,658,314 B1 * 12/2003 Gothait ............... B29C 67/0092
264/409
2003/0207959 A1 * 11/2003 Napadensky ....... B29C 67/0059
522/183
(Continued)

FOREIGN PATENT DOCUMENTS

| JP | 2002-053629 | 2/2002 |
|---|---|---|
| JP | 2005-081563 | 3/2005 |

(Continued)

OTHER PUBLICATIONS

U.S. Appl. No. 15/066,768, filed Mar. 10, 2016.
(Continued)

*Primary Examiner* — Leith S Shafi
(74) *Attorney, Agent, or Firm* — Oblon, McClelland, Maier & Neustadt, L.L.P.

(57) ABSTRACT

A method of manufacturing a three-dimensional object includes imparting a first liquid having a first composition including a solvent and a curable material and a second liquid having a second composition to form a liquid film, curing the liquid film, and repeating the imparting and the curing to obtain the three-dimensional object, wherein the imparting position and the imparting amount of each of the first liquid and the second liquid are controlled in such a manner that the liquid film includes multiple areas where at
(Continued)

least one of post-curing compression stress and post-curing modulus of elasticity is different.

14 Claims, 21 Drawing Sheets

(30) Foreign Application Priority Data

| Jul. 22, 2015 | (JP) | 2015-145151 |
| Nov. 26, 2015 | (JP) | 2015-231140 |
| Mar. 28, 2016 | (JP) | 2016-063311 |

(51) Int. Cl.
*B29C 64/40* (2017.01)
*B33Y 70/00* (2020.01)
*B33Y 10/00* (2015.01)
*B33Y 50/02* (2015.01)
*B33Y 30/00* (2015.01)
*B33Y 80/00* (2015.01)
*B29K 105/00* (2006.01)

(52) U.S. Cl.
CPC .............. *B33Y 10/00* (2014.12); *B33Y 30/00* (2014.12); *B33Y 50/02* (2014.12); *B33Y 70/00* (2014.12); *B33Y 80/00* (2014.12); *B29K 2105/0002* (2013.01); *B29K 2105/0005* (2013.01); *B29K 2105/0073* (2013.01)

(58) Field of Classification Search
CPC ... B29C 64/112; B29C 64/386; B29C 64/129; B29C 64/40; B29C 67/0092; B29C 67/0088; B29C 67/0059; B29K 2105/0002; B29K 2105/0005; B29K 2105/0073
See application file for complete search history.

(56) References Cited

U.S. PATENT DOCUMENTS

| 2004/0187714 | A1* | 9/2004 | Napadensky | B29C 33/448 |
| | | | | 101/35 |
| 2005/0014005 | A1* | 1/2005 | Kramer | B29C 64/40 |
| | | | | 428/413 |
| 2005/0053798 | A1 | 3/2005 | Maekawa et al. | |
| 2005/0192372 | A1 | 9/2005 | Napadensky et al. | |
| 2007/0168815 | A1 | 7/2007 | Napadensky et al. | |
| 2009/0105363 | A1 | 4/2009 | Napadensky | |
| 2011/0077321 | A1 | 3/2011 | Napadensky | |
| 2013/0234370 | A1* | 9/2013 | Suzuki | C08F 220/10 |
| | | | | 264/401 |
| 2015/0210016 | A1* | 7/2015 | Okamoto | B29C 67/0092 |
| | | | | 428/206 |

FOREIGN PATENT DOCUMENTS

| JP | 2007-169364 | 7/2007 |
| JP | 2008-126459 | 6/2008 |
| JP | 2013-043409 | 3/2013 |
| JP | 2015-3973 A | 1/2015 |
| JP | 2015-78255 A | 4/2015 |
| JP | 2015-136895 | 7/2015 |
| JP | 2015-138192 | 7/2015 |
| WO | WO 2015/111366 A1 | 7/2015 |

OTHER PUBLICATIONS

Extended European Search Report dated Dec. 6, 2016 in patent application No. 16177803.0.
Japanese Office Action dated Jun. 4, 2019 in Japanese Patent Application No. 2015-145139, citing documents AO and AP therein, 3 pages.

* cited by examiner

METHOD OF MANUFACTURING THREE-DIMENSIONAL OBJECT, LIQUID SET FOR MANUFACTURING THREE-DIMENSIONAL OBJECT, DEVICE FOR MANUFACTURING THREE-DIMENSIONAL OBJECT, AND GEL OBJECT

CROSS-REFERENCE TO RELATED APPLICATIONS

This patent application is based on and claims priority pursuant to 35 U.S.C. § 119 to Japanese Patent Application Nos. 2015-135174, 2015-145139, 2015-145151, 2015-231140, and 2016-063311, filed on Jul. 6, 2015, Jul. 22, 2015, Jul. 22, 2015, Nov. 26, 2015, and Mar. 28, 2016, respectively, in the Japan Patent Office, the entire disclosures of which are hereby incorporated by reference herein.

BACKGROUND

Technical Field

The present invention relates to a method of manufacturing a three-dimensional object, a liquid set for manufacturing a three-dimensional object, a device for manufacturing a three-dimensional object, and a gel object.

Description of the Related Art 3D printing or Additive Manufacturing (AM) is known as a technology to form a three-dimensional object.

This technology calculates cross-sections sliced vertical to lamination direction and forms and laminates respective layers according to the form of cross-sections to form a three-dimensional object.

As the method of manufacturing a three-dimensional object, for example, a fused deposition molding (FDM) method, an inkjetting method, a binder jetting method, a material jetting method, a stereo lithography apparatus (SLA) method, and a selective laser sintering method are known. Of these, images of photocurable liquid resins are formed at positions for a three-dimensional object by the material jetting method and multi-layered to form the three-dimensional object.

A device for manufacturing the three-dimensional object is developed, which laminates forming materials according to the filling ratio or the mixing ratio indicating the degree of density of the forming materials and changes the mass by using different materials depending on areas or parts to form a three-dimensional object.

SUMMARY

According to the present invention, provided is an improved method of manufacturing a three-dimensional object which includes imparting a first liquid having a first composition including a solvent and a curable material and a second liquid having a second composition to form a liquid film, curing the liquid film, and repeating the imparting and the curing to obtain the three-dimensional object, wherein the imparting position and the imparting amount of each of the first liquid and the second liquid are controlled in such a manner that the liquid film includes multiple areas where at least one of post-curing compression stress and post-curing modulus of elasticity is different.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
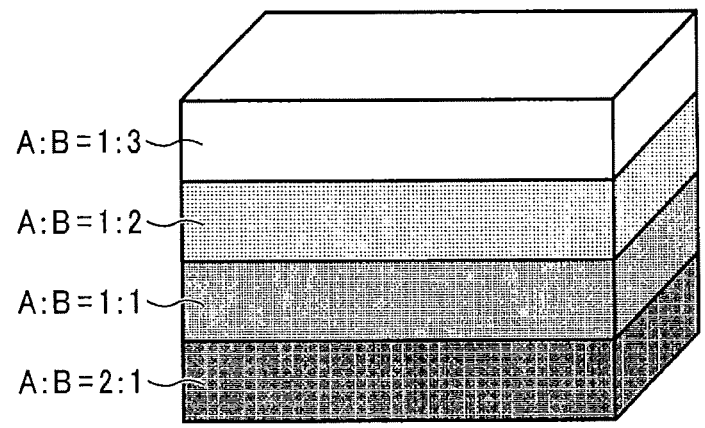
FIG. 1 is a schematic diagram illustrating an example of strength distribution in a three-dimensional object (hydrogel object) of Example 1 described later containing water as the main ingredient when changing the mass ratio of the first liquid and the second liquid in the hydrogel object per layer.

The accompanying drawings are intended to depict example embodiments of the present invention and should not be interpreted to limit the scope thereof. The accompanying drawings are not to be considered as drawn to scale unless explicitly noted.

DESCRIPTION OF THE EMBODIMENTS

Method of Manufacturing Three-dimensional Object and Device for Manufacturing Three-dimensional Object The method of manufacturing a three-dimensional object of the present disclosure includes discharging liquid including a first liquid including a solvent and a curable material and a second liquid having a different composition (second composition) from the first composition of the first liquid to form a liquid film, curing the liquid film to form a cured layer, and repeating the discharging and the curing to manufacture the three-dimensional object, wherein the imparting position and the imparting amount of each of the first liquid and the second liquid are controlled in such a manner that the liquid film includes multiple areas where at least one of post-curing compression stress and post-curing modulus of elasticity is different.

The method of manufacturing a three-dimensional object of the present disclosure is based on what the present inventors have found, which is that forming a liquid film having multiple areas where at least one of post-curing compression stress and post-curing modulus of elasticity or a device which simply forms such a liquid film has not been developed yet.

The present inventors have found the following:

Gels have mixed characteristics of liquid and a solid and include a solvent stably taken inside the three-dimensional network of organic polymer compounds, etc. These are widely used in the fields of medicine, medical care, food, agriculture, and industry. Of these gels, gels having water as the main ingredient of the solvent (also hereinafter referred to as hydrogel) have biological compatibility due to high containing ratio of water so that application thereof to medical care is expected.

In addition, needs for three-dimensional objects formed of a gel or a hydrogel having a soft form which can control hardness in the three-dimensional object are increasing on application to alternatives (for example, cartilage and hyaline body of eye balls, etc.) of a biological body.

However, no method of manufacturing a three-dimensional object reproducing a complex and fine structure from three-dimensional data or freely controlling hardness inside the three-dimensional object is not provided yet in reality.

To manufacture a three-dimensional object, it is preferable to use typical inkjet three-dimensional object manufacturing methods. However, the present inventors have found that it is extremely difficult to control hardness of the inside of an obtained three-dimensional object.

The method of manufacturing a three-dimensional object of the present disclosure includes a first process of imparting a first liquid having a first composition including a solvent and a curable material and a second liquid having a second composition to form a liquid film and a second process of curing the liquid film, and repeating the first process and the second process multiple times to obtain the three-dimensional object, wherein the imparting position and the imparting amount of each of the first liquid and the second liquid are controlled in such a manner that the liquid film includes multiple areas where at least one of post-curing compression stress and post-curing modulus of elasticity are different. There is no specific limitation to how many times the imparting (first process) and the curing (second process) are repeated. It can be suitably selected to suit to the size and form of a three-dimensional object to be manufactured.

With regard to the size of the three-dimensional object, the average thickness per layer is preferably 10-50 μm. When the average thickness is 10-50 μm, it is possible to accurately manufacture a three-dimensional object free of peel-off so that the layers are piled up as high as the three-dimensional object.

In the method of manufacturing a three-dimensional object, the position and the amount of the first liquid and the second liquid to be imparted are controlled so that a liquid film is formed which has multiple areas where at least one of post-curing compression stress and post-curing modulus of elasticity is continuously different. Therefore, it is possible to efficiently manufacture a three-dimensional object including areas each having different compression stress and modulus of elasticity.

The multiple areas where at least one of post-curing compression stress and post-curing modulus of elasticity is continuously different are present in the same liquid film or across films obtained in the first process. Of these, it is preferable that the post-curing compression stress and/or post-curing modulus of elasticity be continuously different in the same film obtained in the first process.

With regard to the position and the amount of the first liquid and the second liquid, there is no specific limitation thereto and they can be suitably selected to suit to a particular application if they are different in a single film or across films.

In addition, it is also preferable that the method of manufacturing a three-dimensional object include an embodiment including a liquid imparting process to impart the first liquid and the second liquid in the liquid set for manufacturing a three-dimensional object described later and a film curing process to cure the imparted film.

Each process in the method of manufacturing a three-dimensional object is described in detail.

First Process and First Device

The first process (liquid imparting process) includes imparting the first liquid containing a solvent and a curable material and the second liquid having different composition from that of the first liquid to a single area.

The first process is suitably conducted by a liquid imparting device to impart the first liquid and the second liquid.

There is no specific limitation to the method of imparting the first liquid and the second liquid as long as liquid droplets are applied to a target area with an appropriate precision. The method can be suitably selected to suit to a particular application. For example, a liquid discharging method is suitable. For example, the liquid discharging method includes a dispenser method, a spray method, or an inkjet method. Known devices are used to conduct these methods.

Of these, the dispenser method is excellent liquid quantitative property but the application area is small. The spray method is capable of simply forming a fine discharging material, has a wide application area, and demonstrates excellent applicability but the quantitative property thereof is poor so that powder scatters due to the spray stream. The inkjet method has a good quantitative property in comparison with the spray method and a wider application area in comparison with the dispenser method. Accordingly, the inkjet method is capable of accurately and efficiently forming a complex object. For this reason, in the present disclosure, using the inkjet method is preferable.

When the liquid discharging method is used, it is preferable to have a nozzle capable of discharging the first liquid and the second liquid. As for the nozzle, nozzles in a known inkjet printer can be suitably used. In addition, it is possible to use, for example, MH5420/5440 (manufactured by Ricoh Industry Company, Ltd.). It is preferable to use the inkjet printer because the head portion can drip a large amount of the liquid at once and the application area is large, which leads to high application performance.

First Liquid

The first liquid includes a solvent, a curable material, and other optional ingredients.

The first liquid has a different composition from the second liquid.

Solvent

Specific examples of the solvent include, but are not limited to, water, alcohol, ketone, ether, ester, and hydrocarbons. These can be used alone or in combination.

Specific examples of alcohol include, but are not limited to, methanol, ethanol, 1-propanol, 2-propanol, 1-butanol, 2-butanol, isobutyl alcohol, tert-butyl alcohol, 1-pentanol, 1-hexanol, 1-octanol, 2-ethyl-1-hexanol, allyl alcohol, benzyl alcohol, cyclohexanol, 1,2-ethane diol, 1,2-propane diol, 2-methoxy ethanol, 2-ethoxy ethanol, 2-propoxy ethanol, 2-(methoxyethoxy)ethanol, 1-methoxy-2-propanol, dipropylene glycol monomethylether, diacetone alcohol, ethyl carbitol, and butyl carbitol. These can be used alone or in combination.

Specific examples of the ketone include, but are not limited to, acetone, methylethylketone, 2-pentanone, 3-pentanonoe, 2-hexanone, methyl isobutyl ketone, 2-heptanone, 4-heptanone, diisobutylketone, and cyclohexanone. These can be used alone or in combination.

Specific examples of the ether include, but are not limited to, diethylether, dipropylether, diisopropylether, dibutylether, 1,4-dioxane, tetrahydrofuran, and 1,2-diethoxyethane. These can be used alone or in combination.

Specific examples of the ester include, but are not limited to, methyl acetate, ethyl formate, propyl formate, ethyl formate, propyl acetate, butyl acetate, ethylene glycol monoethylether acetate, ethylene glycol monobutylether acetate, hydroxyethylmethacrylate, hydroxyethyl acrylate, γ-butylolactone, methyl methacrylate, isobutyl acrylate, cyclohexyl acrylate, 2-ethoxyethyl acrylate, trifluoroethyl acrylate, and glycidyl methacrylate. These can be used alone or in combination.

Specific examples of the hydrocarbon include, but are not limited to, n-hexane, cyclohexane, benzene, toluene, xylene, solvent naphtha, styrene, and halogen hydrocarbon such as dichloromethane and trichloroethylene. These can be used alone or in combination.

Of these, water and toluene are preferable.

Curable Materials

There is no specific limitation to the curable material and a suitable curable material is selected to suit to a particular application. For example, compounds having a photopolymerizable functional group is preferable and polymerizable monomers are more preferable.

There is no specific limitation to the polymerizable monomer. It can be selected to suit to a particular application. Compounds including an ethylenic unsaturated group curable by a photopolymerization initiator producing a radical such as a (meth)acryloyl group, a vinyl group, and an allyl group and compounds having a cyclic ether group curable by a photoacid generator producing an acid such as an epoxy group are preferable. In terms of curing property, compounds including an ethylenic unsaturated group are more preferable.

Examples of the compound including an ethylenic unsaturated group are compounds having (meth)acrylamide group, (meth)acrylate compounds, compounds having a (meth)acryloyl group, compounds having a vinyl group, and compounds having an allyl group.

As the polymerizable monomer, for example, monovalent polymerizable monomers and polyfuncitonal polymerizable monomers are suitable. These can be used alone or in combination.

Monovalent Polymerizable Monomer

Specific examples of the monovalent polymerizable monomer include, but are not limited to, acrylamide, N-substituted acrylamide derivatives, N,N-di-substituted acrylamide derivatives, N-substituted methacrylamide derivatives, N—N-di-substituted methcrylamide derivatives, 2-etylhexyl(meth)acrylate (EHA), 2-hydroxyethyl(meth)acrylate (HEA), 2-hydroxypropyl(meth)acrylate (HPA), caprolactone-modified tetrahydrofurfuryl(meta)acrylate, isobonyl (meth)acrylate, 3-methoxybutyl(meth)acrylate, tetrahydro furfuryl(meth)acrylate, lauryl(meth)acrylate, 2-phenoxyethyl (meth)acrylate, isodecyl(meth)acrylate, isooctyl(meth)acrylate, tridecyl(meth)acrylate, caprolactone(meth)acrylate, and ethoxyfied nonylphenol(meth)acrylate.

These can be used alone or in combination. Of these, acrylamide, N,N-dimethylacrylamide, N-isopropylacrylamide, and acryloyl morpholine are preferable.

Organic polymers can be obtained by polymerizing the mono-valent polymerizable monomer.

The proportion of the mono-valent polymerizable monomer is 0.5-20 percent by mass to the total amount of the first liquid.

Polyfunctional Polymerizable Monomer

Furthermore, the polyfuncitonal polymerizable monomer includes a bi-functional polymerizable monomer and a tri- or higher functional polymerizable monomer. These can be used alone or in combination.

Specific examples of the bi-functional monomer include, but are not limited to, tripropylene glycol di(meth)acrylate, triethylene glycol di(meth)acrylate, tetraethylene glycol di(meth)acrylate, polypropylene glycol di(meth)acrylate, neopentyl glycol hydroxy pivalic acid ester di(meth)acrylate (MANDA), hydroxypivalic acid neopentyl glycol ester di(meth)acrylate (HPNDA), 1,3-butanediol di(meth)acrylate (BGDA), 1,4-butanediol di(meth)acrylate (BUDA), 1,6-hexanediol di(meth)acrylate (HDDA), 1,9-nonane diol (meth)acrylate, diethylene glycol di(meth)acrylate (DEGDA), neopentyl glycol di(meth)acrylate (NPGDA), tripropylene glycol di(meth)acrylate (TPGDA), caprolactone-modified hydroxy pivalic acid neopentyl glycol ester di(meth)acrylate, propoxinated neopentyl glycol di(meth)acrylate, ethoxy-modified bisphenol A di(meth)acrylate, polyethylene glycol 200 di(meth)acrylate, polyethylene glycol 400 di(meth)acrylate, and methylenebis acrylamide. These can be used alone or in combination.

Specific examples of the tri- or higher functional polymerizable monomers include, but are not limited to, trimethylol propane tri(meth)acrylate (TMPTA), pentaerythritol tri (meth)acrylate (PETA), dipentaerythritol hexa(meth) acrylate (DPHA), tirallyl isocyanate, ε-caprolactone modified dipentaerythritol (meth)acrylate, tris(2-hydroxyethyl)isocyanulate, ethoxified trimethylol propane tri(meth) acrylate, propoxified trimethylol propane tri(meth)acrylate, propoxified glyceryl tri(meth)acrylate, pentaerythritol tetra (meth)acrylate, dipentaerythritol tetra(meth)acrylate, pentaerythritol tetra(meth)acrylate, dipentaerythritol hydroxypenta(meth)acrylate, ditrimethylol propane tetra(meth)acrylate, ethoxified(pentaerythritol) tetra(meth)acrylate, and penta(meth)acrylate ester.

These can be used alone or in combination.

The proportion of the polyfunctional polymerizable monomer is 0.01-10 mol percent to the total amount of the mono-functional monomer in the first liquid. When the proportion is 0.01-10 mol percent, gel compression stress is easily adjusted.

When the three-dimensional object is an internal organ model, the three-dimensional object is preferably a soft three-dimensional object of a hydrogel object containing water as the main ingredient.

As the soft three-dimensional object, an organic-inorganic hydrogel is preferable which contains water and an ingredient dissoluble in the water in a three-dimensional network structure formed by complexing a water-soluble organic polymer and a dispersion of a laminate clay mineral.

In this case, the first liquid preferably includes water and hygrogel precursor. The first liquid containing water and the hygrogel precursor is also referred to as "material for soft shape forming object".

Water

As the water, deionized water, ultrafiltered water, reverse osmosis water, pure water such as distilled water, and ultra pure water are suitable.

It is suitable to dissolve or disperse other ingredients such as organic solvents in the water to impart moisturizing property, antibiotic property, and conductivity and adjust compression stress and modulus of elasticity.

Property of Hydrogel Precursor

The hygrogel precursor contains a mineral, a polymerizable monomer, and optional other ingredients.

Mineral

The mineral has no specific limitation and is suitably selected to suit to a particular application. For example, minerals dispersible in water are suitable.

An example of the mineral dispersible in water is a dispersion of a laminated clay mineral.

The dispersion of the laminated clay mineral is uniformly dispersible in water at the level of primary crystal.

Specific examples thereof include, but are not limited to, water swellable smectite and water swellable mica. More specific examples include, but are not limited to, water swellable hectorite containing sodium as ion between layers, water swellable montmorillonite, water swellable saponite, and water swellable synthesized mica. These can be used alone or in combination. Also, these can be appropriately synthesized or available on the market.

Specific examples of the product available on the market include, but are not limited to, synthesized hectorite (laponite XLG, manufactured by RockWood), SWN (manufactured by Coop Chemical Ltd.), and fluorinated hectorite SWF (manufactured Coop Chemical Ltd.).

There is no specific limitation to the proportion of the mineral and it can be suitably selected to suit to a particular application. It is preferably 1-40 part by mass to the total content of the first liquid.

Polymerizable Monomer

As the polymerizable monomer in the hydrogel precursor, it is possible to use the same polymerizable monomer as the curable material in the first liquid.

The polymerizable monomer is polymerized to become an organic polymer.

As the organic polymer, water soluble organic polymers are preferable in terms of usage of hydrogel precursor.

As the water-soluble organic polymer, water-soluble organic polymers having, for example, an amide group, an amino group, a hydroxyl group, a tetramethyl ammonium group, a silanol group, an epoxy group, etc. are suitable.

The water soluble organic polymers having an amide group, an amino group, a hydroxyl group, a tetramethyl ammonium group, a silanol group, an epoxy group, etc. are advantageous to maintain the strength of a hydrogel.

The volume of the droplet of the first liquid has no particular limitation and can be suitably selected to suit to a particular application. For example, the volume is preferably 2-60 pL and more preferably 15-30 pL. When the volume of the droplet of the first liquid is 2 pL or greater, the discharging stability is improved. When the volume is 60 pL or less, filling a discharging nozzle for forming (shape-forming) with liquid is easy.

There is no specific limitation to the amount (percent by mass) of the first liquid in the liquid film formed in the first process. It can be selected to suit to a particular application. The amount is controlled based on the imparting amount of the first liquid.

The imparting amount of the first liquid is calculated by multiplying the volume of the liquid droplet of the first liquid by the number of droplets in the first liquid.

Other Ingredients

The other optional ingredients in the first liquid have no particular limit. For example, stabilizers, surface treatment chemicals, polymerization initiators, coloring materials, viscosity modifiers, drying retarders, adhesion imparting agents, antioxidants, anti-aging agents, cross-linking promoters, ultraviolet absorbents, plasticizers, preservatives, dispersants, and polymerization promoters.

Stabilizer

Stabilizers are used to disperse and stabilize the mineral to keep a sol state.

In addition, stabilizers are also optionally used to stabilize properties of the liquid in the liquid discharging method.

As the stabilizer, for example, highly concentrated phosphates, glycols, and non-union surfactants are suitable.

The non-union surfactants can be synthesized or products available on the market are also usable. A specific example of the product is LS106 (Kao Corporation).

Surface Treatment Chemical

Specific examples of the surface treatment chemical include, but are not limited to, polyester resins, polyvinyl acetate resins, silicone resins, coumarone resins, esters of aliphatic acids, glyceride, and wax.

Polymerization Initiator

Examples of the polymerization initiator are thermal polymerization initiators and photopolymerization initiators. Of these, in terms of storage stability, photopolymerization initiators are preferable because it produces a radical or a cation at irradiation of an active energy ray.

As the photopolymerization initiator, any material can be used which produces a radical at irradiation of light (ultraviolet having in a wavelength range of 220-400 nm).

Specific examples of the photopolymerization initiator include, but are not limited to, acetophenone, 2,2-diethoxyacetophenone, p-dimethylaminoacetone, benzophenone, 2-chlorobenzophenone, p,p'-dichlorobenzophenone, p,p-bisdiethylamonobenzophenoen, Michler's Ketone, benzyl, benzoin, benzoin methylether, benzoin ethylether, benzoin isopropylether, benzoin-n-propylether, benzoin isobutylether, benzoin-n-butylether, benzylmethyl ketal, thioxanthone, 2-chlorothioxanthone, 2-hydroxy-2-methyl-1-phenyl-1-one, 1-(4-isopropylphenyl)-2-hydroxy-2-methylpropane-1-one, methylbenzoyl formate, 1-hydroxy cyclohexyl phenylketone, azobisisobutylo nitrile, benzoylperoxide, and di-tert-butylperoxide. These can be used alone or in combination.

The photopolymerization initiator is available on the market. A specific example thereof is Irgacure 184 (manufactured by BASF).

The thermal polymerization initiator has no particular limitation and can be suitably selected to suit to a particular application. Examples thereof are azo-based initiators, peroxides initiators, persulfate initiators, and oxidation-reduction initiators. These can be used alone or in combination.

Specific example of the azo-based initiator include, but are not limited to, VA-044, VA-46B, VA-50, VA-057, VA-061, VA-067, VA-086, 2,2'-azobis(4-methoxy-2,4-dimethylvaleronitrile) (VAZO 33), 2,2'-azobis(2-amidinopropane)dihydrochloride (VAZO 50), 2,2'-azobis(2,4-dimetaylvaleronitrile) (VAZO 52), 2,2'-azobis(isobutylonitrile) (VAZO 64), 2,2'-azobis-2-methylbutylonitrile) (VAZO 67), and 1,1-azobis(1-cyclohexane carbonitrile) (VAZO 88) (all available from Dupont Chemical), 2,2'-azobis(2-cyclopropylpropionitrile), and 2,2'-azo-bis(methylisobutylate) (V-601) (all available from Wako Pure Chemical Industries, Ltd.). These can be used alone or in combination.

Specific examples of the peroxide initiator include, but are not limited to, benzoyl peroxide, acetyl peroxide, lauroyl peroxide, decanoyl peroxide, dicetyl peroxy dicarbonate, di(4-t-butylcyclohexyl)peroxy dicarbonate (Perkadox 16S) (available from Akzo Nobel), di(2-ethylhexyl)peroxy dicarbonate, t-butyl peroxypivalate (Lupersol 11) (all available from Elf Atochem), t-butylperoxy-2-ethyl hexanoate (Trigonox 21-C50) (available from Akzo Nobel), and dicumyl peroxide. These can be used alone or in combination.

Specific examples of the persulfate initiator include, but are not limited to, potassium persulfate, sodium persulfate, ammonium persulfate, and sodium peroxodisulfate. These can be used alone or in combination.

Specific examples of oxidation-reduction initiator include, but are not limited to, a combination of the persulfate initiator and a reducing agent such as methacid sodium sulfite and acid sodium sulfite, a system based on the organic peroxide and tertiary amine (such as a system based on benzoyl peroxide and dimethylaniline), and a system based on organic hydroperoxide and transition metal (such as a system based on cumenhydroperoxide and cobalt naftate). These can be used alone or in combination.

The photopolymerization initiator is preferably independently included in the second liquid having a composition different from that of the first liquid. When the photopolymerization initiator is not included in the first liquid but in the second liquid only, storage stability of the first liquid is improved. Also, in terms of storage storage stability, additives can be added more than the case in which the polymerization initiator is used in the first liquid. Therefore, the polymerization ratio of a three-dimensional object increases, thereby improving efficiency of manufacturing.

Like the case of the photopolymerization initiator, the thermal polymerization initiator is preferably included in the second liquid in terms of storage stability of the first liquid. It is preferable to contain a polymerization promoter.

In addition, the proportion of the photopolymerization initiator is preferably not greater than 1 percent by mass to the total content of the liquid set for a three-dimensional object. When the proportion is not greater than 1 percent by mass, inhibition of curing reaction can be prevented after the first liquid and the second liquid are mixed.

Coloring Agent

The coloring agent may be included in the first liquid and/or the second liquid. However, it is preferable that the second liquid contain the coloring agent.

The coloring agent are dissolved or stably dispersed in the second liquid. As the coloring agent, dyes and pigments having excellent thermal stability are suitable. Of these, solvent dyes are preferable. Two or more kinds of coloring agents can be mixed to adjust colors.

For example, black dyes, magenta dyes, cyan dyes, and yellow dyes are suitable as the dye.

Specific examples of the black dyes include, but are not limited to, MS BLACK VPC (manufactured by Mitsui Chemicals, Incorporated), AIZEN SOT BLACK-1 and AIZEN SOT BLACK-5 (Both manufactured by HODOGAYA CHEMICAL CO., LTD.), RESORIN BLACK GSN 200% and RESORIN BLACK BS (both manufactured by Bayer Holding Ltd.), KAYASET BLACK A-N (manufactured by Nippon Kayaku Co., Ltd., DAIWA BLACK MSC (manufactured by Daiwa Fine Chemicals Co., Ltd.), HSB-202 (manufactured by Mitsubishi Chemical Corporation), NEPTUNE BLACK X60 and NEOPEN BLACK X58 (Manufactured by BASF), Oleosol Fast BLACK RL (manufactured by Taoka Chemical Co., Ltd., Chuo BLACK80 and Chuo BLACK80-15 (manufactured by Chuo synthetic Chemical Co., Ltd.).

Specific examples of the magenta dye include, but are not limited to, MS Magenta VP, MS Magenta HM-1450, and MS Magenta Hso-147 (All manufactured by Mitsui Chemicals, Incorporated), AIZEN SOT Red-1, AIZEN SOT Red-2, AIZEN SOT Red-3, AIZEN SOT Pink-1, SPIRON Red GEHSPECIAL (all manufactured by HODOGAYA CHEMICAL CO., LTD.), RESOLIN Red FB 200%, MACROLEX Red Violet R, MACROLEX ROT 5B (all manufactured by Bayer Holding Ltd.), KAYASET ReD B, KAYASET Red 130, and KAYASET ReD 802 (Manufactured by Nippon Kayaku Co., Ltd.), PHLOXIN, ROSE BENGAL, and ACID Red (all manufactured by Daiwa Fine Chemicals Co., Ltd.), HSR-31 AND DIARESIN RedK (both manufactured by Mitsubishi Chemical Corporation), Oil Red (manufactured by BASF), and Oil Pink330 (manufactured by Chuo synthetic Chemical Co., Ltd.).

Specific examples of the cyan dye include, but are not limited to, MS Cyan HM-1238, MS Cyan HSo-16, Cyan Hso-144, and MS Cyan VPG (all manufactured by Mitsui Chemicals, Incorporated), AIZEN SOT Blue-4 (manufactured by HODOGAYA CHEMICAL CO., LTD.), RESOLIN BR.BLUE BGLN 200%, MACROLEX Blue RR, CERES Blue GN, SIRUS SUPRATURQ.Blue Z-BGL, and SIRUS SUPRA TURQ.Blue FB-LL330% (all manufactured by Bayer Holding Ltd.), KAYASET Blue Fr, KAYASET Blue N. KAYASET Blue 814, Turq.Blue GL-5 200, and Light-Blue BGL-5 200 (all manufactured by Nippon Kayaku Co., Ltd.), DAIWA Blue 7000 and Oleosol Fast Blue GL (both manufactured by Daiwa Fine Chemicals Co., Ltd.), DIARESINBLUE P (manufactured by Mitsubishi Chemical Corporation), SUDAN Blue 670, NEOPEN Blue808, and ZAPON Blue 806 (all manufactured by BASF).

Specific examples of the yellow dye include, but are not limited to, MS Yellow HSm-41, Yellow KX-7, and Yellow EX-27 (manufactured by Mitsui Chemicals, Incorporated), AIZEN SOT Yellow-1, AIZEN SOT Yellow-3, and AIZEN SOT Yellow-6 (all manufactured by HODOGAYA CHEMICAL CO., LTD.), MACROLEX Yellow 6G, MACROLEX FLUOR, and Yellow 10 GN (all manufactured by Bayer Holding Ltd.), KAYASET Yellow SF-G, KAYASET Yellow 2G, KAYASET Yellow A-G, and KAYASET Yellow E-G (all manufactured by Nippon Kayaku Co., Ltd.), DAIWA Yellow 330HB (Daiwa Fine Chemicals Co., Ltd.), HSY-68 (Mitsubishi Chemical Corporation), SUDAN Yellow 146 and NEOPEN Yellow 075 (all manufactured by BASF), and Oil Yellow 129 (manufactured by Chuo synthetic Chemical Co., Ltd.)

Examples of the pigments include organic pigments and inorganic pigments. For example, azo pigments (azo lake, insoluble azo pigments, condensed azo pigments, chelate azo pigments, etc.), polycyclic pigments (phthalocyanine pigments, perylene pigments, anthraquinone pigments, quinacridone pigments, dioxazine pigments, thioindigo pigments, isoindolinone pigments, and quinofuranone pigments).

Specific examples of the pigment include, but are not limited to, the organic pigments and inorganic pigments referenced by the following number in Color Index.

Red or Magenta Pigments:
Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 30, 37, 50, 88, and Pigment Orange 13, 16, 20, and 36.

Blue or Cyan Pigments:
Pigment Blue 1, 15, 15:1, 15:2, 15:3, 15:4, 15:6, 16, 17-1, 22, 27, 28, 29, 36, and 60

Green Pigments:
Pigment Green 7, 26, 36, and 50.

Yellow Pigments:
Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Black Pigments:
For example, Pigment Black 7, 26, and 28 are suitable.

The pigments are available on the market. Specific examples thereof include, but are not limited to, CHROMOFINE YELLOW 2080, 5900, 5930, AF-1300, 2700L, CHROMOFINE ORANGE 3700L, 6730, CHROMOFINE SCARLET 6750, CHROMOFINE MAGENTA 6880, 6886, 6891N, 6790, and 6887, CHROMOFINE VIOLET RE, CHROMOFINE RED 6820, 6830, CHROMOFINE BLUE HS-3, 5187, 5108, 5197, 5085N, SR-5020, 5026, 5050, 4920, 4827, 4837, 4824, 4933GN-EP, 4940, 4973, 5205, 5208, 5214, 5221, 5000P, CHROMOFINE GREEN 2GN, 2GO, 2G-500D, 5310, 5370, 6830, CHROMOFINE BLACK A-1103, SEIKAFAST Yellow, 10GH, A-3, 2035, 2054, 2200, 2270, 2300, 2400(B), 2500, 2600, ZAY-260, 2700(B), and 2770, SEIKAFAST RED 8040, C405(F), CA120, LR-116, 1531B, 8060R, 1547, ZAW-262, 1537B, GY, 4R-4016, 3820, 3891, ZA-215, SEIKAFAST CARMINE 6B1476T-7, 1483LT, 6840, and 3870, SEIKAFAST BORDEAUX 10B-430, SEIKALIGHT ROSE R40, SEIKALIGHT VIOLET B800, 7805, SEIKAFAST MAROON 460N, SEIKAFAST ORANGE 900, 2900, SEIKALIGHT BLUE C718, A612, cyanine blue 4933M, 4933GN-EP, 4940, 4973 (all manufactured by Dainichiseika Color & Chemicals Mfg. Co., Ltd.), KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, KET Green 201 (all manufactured by DIC Corporation), Colortex Yellow 301, 314, 315, 316, P-624, 314, U10GN, U3GN, UNN, UA-414, U263, Finecol Yellow T-13, T-05, Pigment Yellow1705, Colortex Orange 202, Colortex Red101, 103, 115, 116, D3B, P-625, 102, H-1024, 105C, UFN, UCN, UBN, U3BN, URN, UGN, UG276, U456, U457, 105C, USN, Colortex Maroon601, Colortex BrownB610N, Colortex Violet600, Pigment Red 122, Colortex Blue516, 517, 518, 519, A818, P-908, 510, Colortex Green402, 403, Colortex Black 702, U905 (all manufactured by Sanyo Color Works, LTD.), Lionol Yellow 1405G, Lionol Blue FG7330, FG7350, FG7400G, FG7405G, ES, ESP-S (all manufactured by TOYO INK CO., LTD.), Toner Magenta E02, Permanent RubinF6B, Toner Yellow HG, Permanent Yellow GG-02, Hostapeam BlueB2G (all manufactured by Hoechst AG, carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (all manufactured by Mitsubishi Chemical Corporation).

Viscosity Modifier

The viscosity modifier is not particularly limited and can be selected to a suitable application. A specific example thereof is propylene glycol.

Drying Retardant

There is no specific limitation to the drying retardant. It can be suitably selected to suit to a particular application. A specific example thereof is glycerin.

Dispersant

There is no specific limitation to the dispersant and it can be suitably selected to suit to a particular application. A specific example thereof is etidronic acid.

Polymerization Promoter

There is no specific limitation to the polymerization promoter and it can be suitably selected to suit to a particular application. A specific example thereof is N,N,N',N'-tetramethylethylene diamine.

There is no specific limitation to the surface tension of the first liquid and it can be selected to suit to a particular application. For example, the surface tension is preferably 20-45 mN/m and more preferably 25-34 mN/m.

When the surface tension is 20 mN/m or greater, discharging stability is improved. When the surface tension is 45 mN/m or less, filling a discharging nozzle for forming (shape-forming) with liquid is easy.

The surface tension can be measured by a surface tensiometer (automatic contact angle DM-701, manufactured by Kyowa Interface Science Co., LTD.), etc.

Viscosity of the first liquid has no particular limitation and can be suitably selected to suit to a particular application. The temperature can be adjusted. For example, viscosity is 3-20 mPa·s and more preferably 6-12 mPa·s at 25 degrees C.

When the viscosity is 3-20 mPa·s, discharging stability can be improved.

The viscosity can be measured by, for example, a rotation viscometer (VISCOMATE VM-150 III, manufactured by TOKI SANGYO CO., LTD.) in a 25 degrees C. environment.

Second Liquid

The second liquid has a composition different from the composition of the first liquid and has a feature to control the density of the ingredient contained in the first liquid when forming a three-dimensional object. That is, in the present disclosure, the first liquid and the second liquid are imparted to the same area and mixed to form a liquid film. The density of the curable material in the liquid film is adjusted by controlling the imparting position and the amount of the first liquid and the second liquid.

The second liquid preferably includes a solvent and other optional ingredients such as a photopolymerization initiator, a thermal polymerization initiator, a mineral, and a cross-linking agent.

As the solvent, the same as those for the first liquid can be used.

The second liquid may further optionally include the same or different polymerizable monomer as in the first liquid.

However, when an additive such as a polymerization initiator is added to the first liquid, it reacts with the curable material (e.g., polymerizable monomer) in the first liquid, which may cause deterioration of storage stability. In such a case, if the additive is added to the second liquid and thereafter the first liquid and the second liquid are mixed, the effect of the additive such as polymerization initiator is imparted to the curable material. Therefore, the second liquid preferably includes no curable material such as a polymerization monomer.

Photopolymerization Initiator and Thermal Polymerization Initiator

As for the thermal polymerization initiator and the photopolymerization initiator, the same material as those for the first liquid can be used.

Although it is possible to include the thermal polymerization initiator and the photopolymerization initiator in the first liquid, it is preferable that the second liquid include them in terms of storage stability.

If a thermal polymerization initiator is contained in addition to a photopolymerization initiator, the thermal polymerization initiator can promote and complete polymerization reaction which is not completed by solely the photopolymerization initiator. In addition, it is preferable to contain a polymerization promoter.

When the first liquid includes the thermal polymerization initiator, the thermal polymerization initiator reacts with the polymerizable monomer, which degrades storage stability of the liquid. Therefore, it is preferable that the second liquid including no polymerizable monomer include a thermal polymerization initiator.

Mineral

As the mineral, the same as those for the first liquid can be used.

Cross-Linking Agent

Specific examples of the cross-linking agent include, but are not limited to, N,N'methylene bisacrylamide and polyethylene glycol diacrylate.

Other Ingredients

The other optional ingredient has no particular limit and can be selected to suit to a particular application.

For example, the same ingredients in the first liquid can be used.

There is no specific limitation to the surface tension of the second liquid and it can be selected to suit to a particular application. For example, the surface tension is preferably 20-45 mN/m and more preferably 25-34 mN/m.

When the surface tension is 20 mN/m or greater, discharging stability is improved. When the surface tension is 45 mN/m or less, filling a discharging nozzle for forming (shape-forming) with liquid is easy.

The surface tension can be measured by a surface tensiometer (automatic contact angle DM-701, manufactured by Kyowa Interface Science Co., LTD.), etc.

Viscosity of the second liquid has no particular limitation and can be suitably selected to suit to a particular application. The temperature can be adjusted. For example, the viscosity is 3-20 mPa·s and more preferably 6-12 mPa·s at 25 degrees C.

When the viscosity is 3-20 mPa·s, discharging stability can be improved.

The viscosity can be measured by, for example, a rotation viscometer (VISCOMATE VM-150 III, manufactured by TOKI SANGYO CO., LTD.) in a 25 degrees C. environment.

The volume of the droplet of the second liquid has no particular limitation and can be suitably selected to suit to a particular application. For example, the volume is preferably 2-60 pL and more preferably 15-30 pL. When the volume of the droplet of the second liquid is 2 pL or greater, the discharging stability is improved. When the volume is 60 pL or less, filling a discharging nozzle for forming (shape-forming) with liquid is easy.

There is no specific limitation to the amount (percent by mass) of the second liquid in the liquid film formed in the first process. It can be selected to suit to a particular application. The amount is controlled based on the imparting amount of the second liquid.

The imparting amount of the second liquid is calculated by multiplying the volume of the liquid droplet of the second liquid by the number of droplets of the second liquid.

Viscosity Change Rate

The viscosity change rate in the first liquid and the second liquid between the viscosity before storage (initial viscosity) and the viscosity after the liquid is left undone for two weeks at 50 degrees C. is preferably not greater than 20 percent and more preferably not greater than 10 percent.

When the viscosity change rate is not greater than 20 percent, storage stability of the first liquid and the second liquid is appropriate. For example, discharging stability is good when the second liquid is imparted by an inkjet method.

The viscosity change rate between the viscosity before storage (initial viscosity) and the viscosity (post storage viscosity) after the liquid is left undone for two weeks at 50 degrees C. can be measured in the following manner.

Each of the liquid of the first liquid and the second liquid is placed in a polypropylene bottle (50 mL) and left undone for two weeks in a constant temperature tank at 50 degrees C. The liquid is taken out from the tank and left undone until the temperature thereof lowers to room temperature (25 degrees C.). Thereafter, viscosity thereof is measured. Each of viscosity of the first liquid and the second liquid before it is placed in the tank is determined as pre-storage viscosity and viscosity of each liquid taken out from the constant temperature tank is determined as post-storage viscosity. The viscosity change rate is calculated according to the following relation. The pre-storage viscosity and the post-storage viscosity can be measured by, for example, an R type viscometer (manufactured by TOKI SANGYO CO., LTD.) at 25 degree C.

Viscosity change rate (percent)={(post-storage viscosity)−(pre-storage viscosity)]/(pre-storage viscosity)}×100

Pre-storage viscosity of the first liquid and the second liquid is preferably a viscosity of 25 mPa·s or less at 25 degrees C., more preferably 3-20 mPa·s, and particularly preferably 3-10 mPa·s. When the viscosity is not greater than 25 mPa·s, discharging the liquid from an inkjet nozzle is stabilized.

Post-storage viscosity of the first liquid and the second liquid is preferably 3-10 mPa·s at 25 degrees.

There is no specific limitation to the method of controlling the imparting position and the imparting amount of the first liquid and the second liquid. It can be suitably selected to suit to a particular application. For example, a control method including changing the volume of a droplet or a control method including changing the number of droplets is suitable.

The method of manufacturing a three-dimensional object of the present disclosure includes mixing the first liquid and the second liquid to conduct reaction to cure the liquids. Therefore, since the first liquid include a curable material (for example, polymerizable monomer), it is preferable that the second liquid include an additive which reacts with the curable material and degrades storage stability.

When a material that lowers storage stability (normally viscosity substantially increases, causing gelation) due to reaction with the curable material in the first liquid is added to the second liquid, the film is gelated immediately after the film is formed during shape-forming, which contributes to improvement on the shape-forming accuracy.

Second Process and Second Device

In the second process, the liquid film formed in the first process is cured and the cured film (layer) is laminated, so that a three-dimensional object having different compression stress and modulus of elasticity depending on area is manufactured. In the post-curing film, a structure formed of the curable material is formed with other ingredients. The second process (liquid film curing process) is suitably conducted by the following second device (film curing device).

As the second device to cure the film, an ultraviolet (UV) irradiating lamps, electron beam irradiators, etc. are used. The liquid curing device preferably has a mechanism to remove ozone.

The ultraviolet irradiating lamp includes, for example, a high pressure mercury lamp and an ultra high pressure mercury lamp, and a metal halide lamp.

The ultra-high pressure mercury lamp is a point light source but if the DeepUV type combined with an optical system to have a high light use efficiency is used, the lamp is capable of emitting light in a short-wavelength range.

Since the metal halide has a wide range of wavelength, it is suitable for colored materials. Halogenated materials of metal such as Pb, Sn, and Fe are used therefor and can be selected to suit to absorption spectrum of a photopolymerization initiator. The lamp for use in curing has no particular limit and can be suitably selected to suit to a particular application. Lamps available on the market such as H lamp, D lamp, or V lamp, (manufactured by Fusion System) can be used.

In the present disclosure, an ultra violet-light emitting diode (UV-LED) is preferably used.

There is no specific limitation to the emitting wavelength of the LED. In general, wavelengths of 365 nm, 375 nm, 385 nm, 395, nm and 405 nm are used. Taking into account the impact on the color of an object, short wavelength irradiation is advantageous to increase absorption of an initiator.

Since thermal energy imparted by a UV-LED during curing is less than that of ultraviolet irradiation lamp (high pressure mercury lamp, ultra pressure mercury lamp, metal halide lamp) for general purpose and electron beams, the heat damage to a sample is reduced.

In particular, the hydrogels formed in the present disclosure are present containing water. Therefore, the feature thereof is demonstrated and the effect is significant.

Third Process and Third Device

The third process includes imparting a third liquid having a third composition forming a hard object to support a three-dimensional object formed of the curable material cured in the second process to a site where no first liquid or second liquid is imparted to form a film. The third process is conducted by the third device.

The same device as the first device for use in the device of manufacturing a three-dimensional object can be the third device to impart the third liquid.

Third Liquid

The third liquid (also referred to as material for hard object) forms a hard object to support a three-dimensional object. The third liquid includes a curable material, preferably a polymerization initiator, and other optional ingredients but no water or laminate viscous mineral.

The third liquid preferably has ingredients different from those of the first liquid and the second liquid.

The curable material is preferably a compound cured in polymerization reaction caused by irradiation of active energy ray (ultraviolet ray, electron beam, etc.), heating, etc.

For example, active energy ray curable compounds and thermally-curable compounds are suitable.

The curable material is preferably liquid at 25 degrees C.

"To impart to a site where no first liquid or second liquid is imparted" is that the site of the third liquid does not overlap the site of the first liquid and the second liquid. However, the third liquid site may be adjacent to the first liquid site or the second site.

The method of imparting the third liquid is not particularly limited and can be suitably selected to suit to a particular application. Preferably, droplets formed of the third liquid are applied to target positions with appropriate precision. For example, a liquid discharging method is suitable. Examples of the liquid discharging method are a dispenser method and an inkjet method.

The third process and device can be replaced with the following.

Using the first liquid and the second liquid for use in the first process, a structure to support a three-dimensional object is manufactured in the same manner. This support structure has significantly different compression stress and modulus of elasticity from the three-dimensional object to be formed. The support structure is cured in the second process as in the case described above. The support structure is removed after the three-dimensional object is formed.

Since the support structure supports a three-dimensional object when forming the three-dimensional object and is removed thereafter, minimal strength to support the object is enough. Alternatively, since increasing removability of the support structure leads to increasing productivity of a three-dimensional object, it is suitable to form a support structure having low modulus of elasticity which easily collapses by an external force.

In either case, it is suitable to form a support structure having a different physical properties from a target three-dimensional object using the first liquid and the second liquid forming the target three-dimensional object. Simply speaking, the ratio of the second liquid to the first liquid in the support structure is significantly changed from the ratio in the target three-dimensional object in a range where it is possible to form the support structure.

Other Optional Process

There is no specific limitation to the other optional processes and a suitable process is selected to suit to a particular application. Specific examples thereof include, but are not limited to, a peeling-off process, a process of polishing a three dimensional object, and a process of cleaning the three-dimensional object.

In particular, it is desirable to introduce a process of smoothing the film cured in the third process.

The formed and cured film in the second process and the third process do not always have desired thickness in all the sites.

In the case of inkjet methods, non-discharging may occur. In both inkjet/dispenser methods, unevenness between dots may occur. As a result, a laminate structure obtained may lack precision.

To compensate this, for example, a film can be smoothed or mechanically scraped immediately after the film is formed. Alternatively, the smoothness is detected and the amount of forming the next film is adjusted to the dot level.

The hygrogel for use in the present disclosure is relatively soft because the target object is an internal organ. Therefore, with regard to smoothing, it is suitable to utilize mechanical smoothing immediately after a film is formed.

For example, the method of mechanically smoothing a film can be conducted by, for example, a member having a blade form or a roller form.

Figure 24:
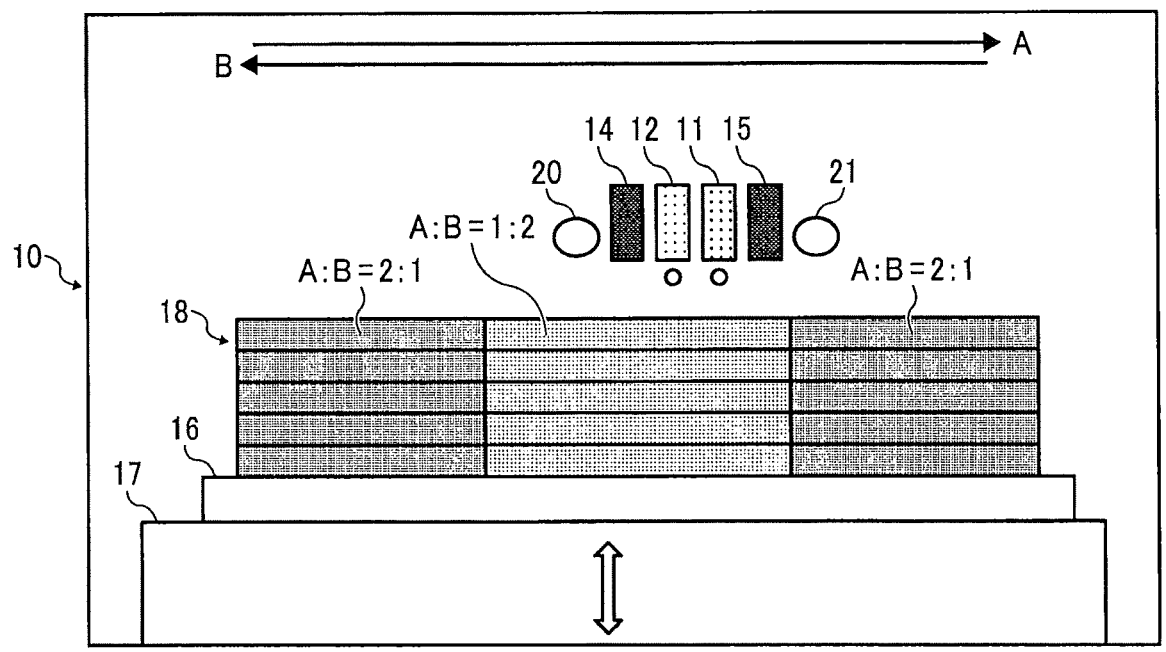
FIG. 24 is a schematic diagram illustrating an example of the device for manufacturing a three-dimensional object for use in the method of manufacturing a three-dimensional object according to an embodiment of the present invention.

FIG. 24 illustrates smoothing members 20 and 21 having a roller form and FIG. 215 illustrates smoothing members 20 and 21 having a blade form.

As described above, in the method of manufacturing a three-dimensional object of the present disclosure, liquid is discharged and imparted through a fine hole in a liquid discharging method to form an image film by film. The first liquid and the second liquid prior to curing are imparted to determined sites in predetermined amounts to form a liquid film having areas having locally different post-curing compression stress and/or post-curing modulus of elasticity. When the ratio of the first liquid and the second liquid is changed, the mass ratio is easily changed so that the amount of a cross-linking agent and a polymerizable polymer per a constant volume can be controlled. For this reason, it is possible to obtain a three-dimensional object having multiple areas having different compression stress and modulus of elasticity.

In a typical method of manufacturing a three-dimensional object, a single or multiple curable materials are imparted to different sites to form a three-dimensional object having portions different compression stress and modulus of elasticity. However, in such a typical manufacturing method, obtained three-dimensional objects have only compression stresses and moduli of elasticity derived from multiple curable materials. As a result, it is not possible to form a three-dimensional object having continuously different compression stresses and moduli of elasticity. To the contrary, in the method of manufacturing a three-dimensional object of the present disclosure, the first liquid and the second liquid are imparted to form a liquid film having multiple areas having different post-curing compression stresses and/or post-curing moduli of elasticity depending on the ratio of the first liquid and the second liquid to control the compression stress and the modulus of elasticity.

By the method of manufacturing a three-dimensional object of the present disclosure, complex and fine soft three-dimensional objects can be simply and efficiently manufactured, which is suitable for manufacturing internal organ models.

The method of manufacturing a three-dimensional object and the device for manufacturing a three-dimensional object are described below with reference to specific embodiments. The method of manufacturing a hydrogel three-dimensional object containing water as the main ingredient is described as a typical example.

The first liquid (also referred to as liquid "A") is used as the liquid material composition for a hydrogel object and the second liquid (also referred to as liquid "B") is used as ink to dilute the liquid "A" including a polymerization initiator to manufacture a hydrogel object containing water as the main ingredient having different compression stresses and moduli of elasticity depending on areas.

First, surface data or solid data of three-dimensional form designed by three dimensional computer-aided design (CAD) or taken in by a three-dimensional scanner or a digitizer are converted into Standard Template Library (STL) format, which is thereafter input into a lamination forming device.

Next, compression stress distribution of the three dimensional form is measured. There is no specific limitation to methods of measuring the compression stress. For example, three-dimensional compression stress distribution data are obtained by using MR Elastography (MRE), which are thereafter input into the lamination forming device. Based on the compression stress data, the amounts of the liquid "A" and the liquid "B" to be imparted to sites corresponding to the three-dimensional data are determined.

Based on the these input data, the direction of the three-dimensional form to be formed is determined.

The direction is not particularly limited. Normally, the direction is chosen in which the Z direction (height direction) is the lowest.

After the direction of the three-dimensional form is determined, the projected areas in X-Y plane, X-Z plane, and Y-Z plane of the three-dimensional form are obtained to obtain a block form thereof. The thus-obtained block form is sliced in the Z direction with a thickness of a single layer. The thickness of a single layer changes depending on the material and is preferably, for example, 20 to 60 µm. When only one three-dimensional object is manufactured, this block form is arranged to be placed in the center of the Z stage (i.e., table on which the object lifted down layer by layer for each layer forming is placed).

In addition, when a plural of three-dimensional objects are manufactured at the same time, the block forms are arranged on the Z stage. Also, the block forms can be piled up. It is possible to automatically create these block forms, the slice data (contour line data), and the placement on the Z stage if materials to be used are determined.

Figure 20:
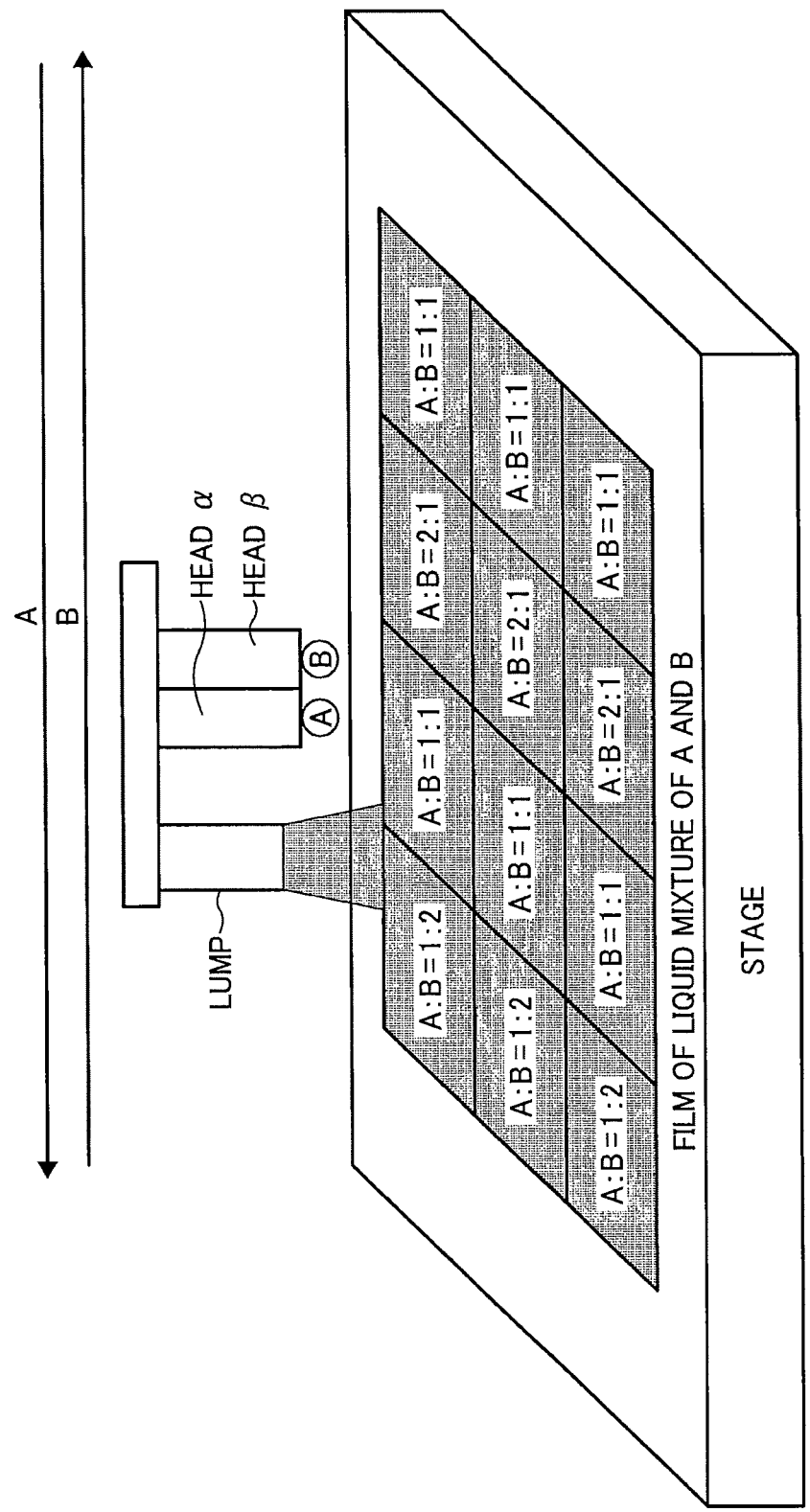
FIG. 20 is a schematic diagram illustrating an example of the device for manufacturing a three-dimensional object for use in the method of manufacturing a three-dimensional object according to an embodiment of the present invention.
Figure 21:
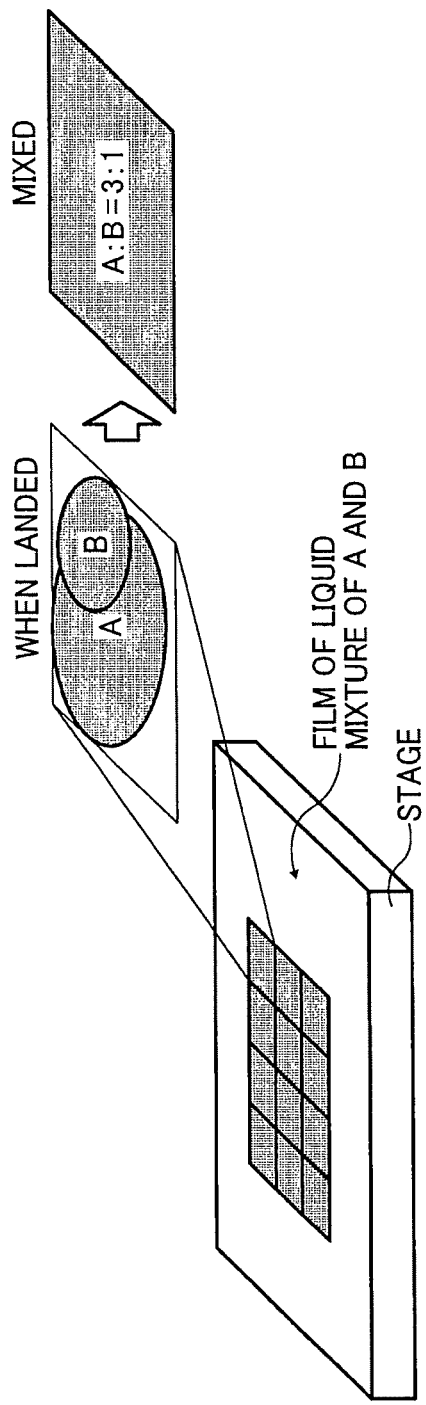
FIG. 21 is a schematic diagram illustrating an example in which the first liquid and the second liquid according to the liquid discharging method according to an embodiment of the present disclosure.

The next forming process is conducted. Different heads α and β (illustrated in FIG. 20) are moved bi-directionally (direction A and direction B indicated by respective arrows) and discharge the liquid "A" and the liquid "B" to a determined area in a determined imparting ratio to form a dot. The liquid "A" and the liquid "B" are mixed in the dot as illustrated in FIG. 21 to obtain the pre-determined mass ratio (liquid "A":liquid "B").

Moreover, such dots are continuously formed to form a liquid mixture liquid film of the liquid "A" and the liquid "B" having the pre-determined mass ratio (liquid "A":liquid "B") in the pre-determined area. Thereafter, the liquid mixture liquid film is irradiated with ultraviolet (UV) ray and cured to form a hygrogel film having the pre-determined ratio (liquid "A":liquid "B") in the pre-determined area as illustrated in FIG. 20.

After a single layer of the hygrogel film is formed, the stage (FIG. 20) is lowered in an amount corresponding to the thickness of the single layer. Again, the dots are continuously formed on the hydrogel film to form a liquid mixture liquid film of the liquid "A" and the liquid "B" having a pre-determined mass ratio (liquid "A":liquid "B") in a pre-determined area. Thereafter, the liquid mixture liquid film of the liquid "A" and the liquid "B" is irradiated with ultraviolet (UV) ray and cured to form a hygrogel film. These processes are repeated to form a three-dimensional object as illustrated in FIG. 22.

Figure 22:
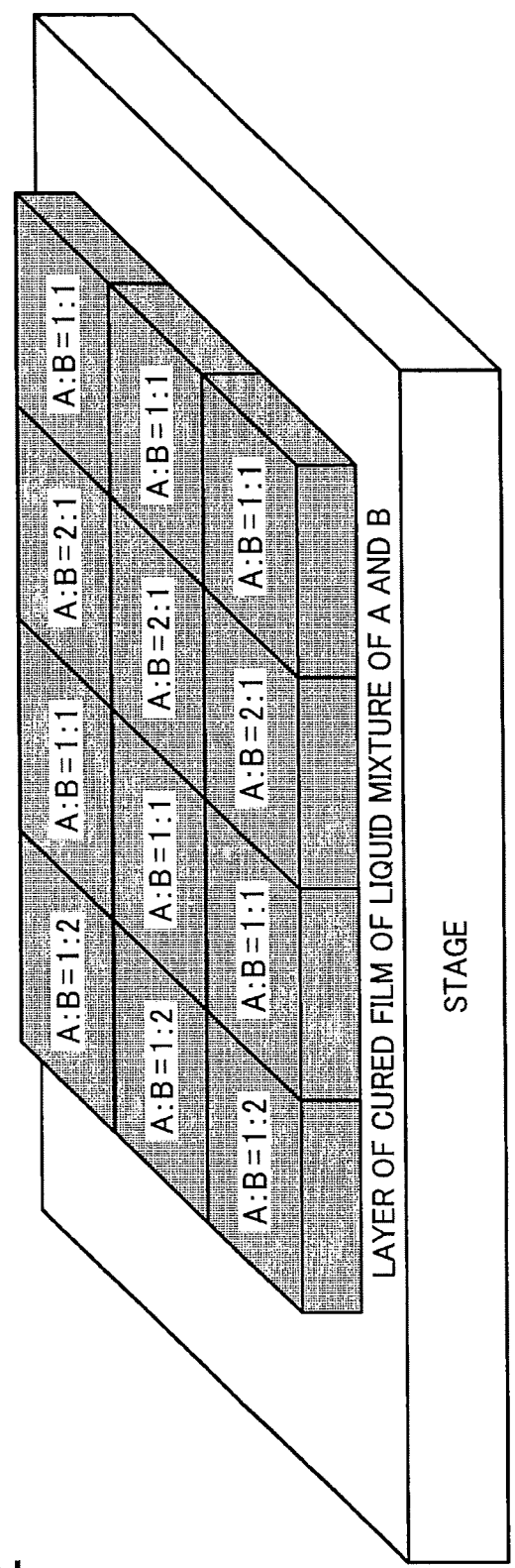
FIG. 22 is a schematic diagram illustrating an example where the mass ratio distribution of the first liquid and the second liquid are changed in the three-dimensional object according to an embodiment of the present invention.

The thus-obtained three-dimensional object (hydrogel object) containing water as the main ingredient has different mass ratios (liquid "A":liquid "B") depending on the portion in the hydrogel object as illustrated in FIG. 22. Compression stress and modulus of elasticity therein can be continuously changed.

Furthermore, the UV ray irradiator is arranged next to an inkjet head jetting a hygrogel precursor to save time to be taken for smoothing treatment, thereby speeding up the manufacturing. If a UV-LED is used as the UV ray irradiator, it is possible to reduce thermal energy used to irradiate an object when forming the object.

Figure 25:
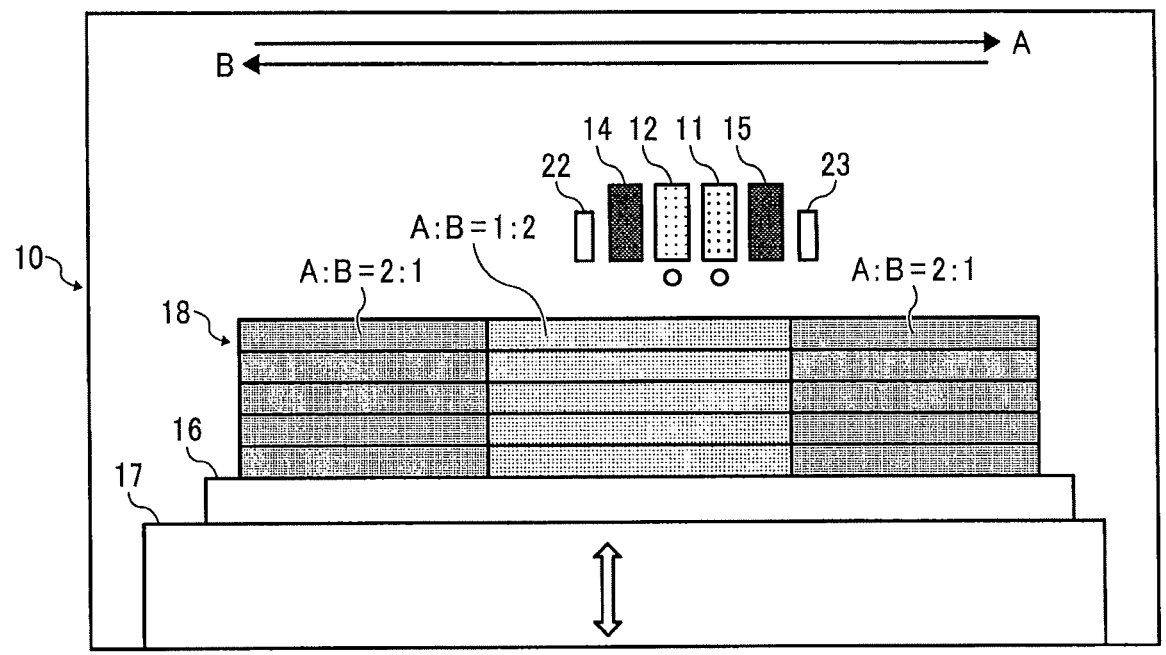
FIG. 25 is a schematic diagram illustrating an example of the device for manufacturing a three-dimensional object for use in the method of manufacturing a three-dimensional object according to an embodiment of the present invention.

As illustrated in FIGS. 24 and 25, if smoothing members 20, 21, 22, and 23 are provided adjacent to the inkjet head and the UV ray irradiator 14 and 15, smoothing and controlling the thickness layer by layer are possible, which is very useful to the manufacturing in the present disclosure.

Liquid Set for Manufacturing Three-Dimensional Object

The liquid set for manufacturing a three-dimensional object of the present disclosure includes the first liquid, the second liquid, and other optional ingredients.

The first liquid preferably includes water as the solvent and a polymerizable monomer as the curable material, more preferably a mineral, and furthermore preferably a polymerization initiator.

As the polymerizable monomer, the same polymerizable monomer as in the first liquid in the method of manufacturing a three-dimensional object can be used.

The second liquid preferably includes at least one of a cross-linking agent and a mineral and more preferably a polymerization initiator.

As the cross-linking agent, the same cross-linking agent as in the second liquid in the method of manufacturing a three-dimensional object can be used.

As the mineral, the same mineral as in the second liquid in the method of manufacturing a three-dimensional object can be used.

As the polymerization initiator in the first liquid and the second liquid, the same polymerization initiator as in the second liquid in the method of manufacturing a three-dimensional object can be used.

The liquid set for manufacturing a three-dimensional object is suitably used to manufacture various three-dimensional objects. In particular, the liquid set is suitable to manufacture complex and fine three-dimensional objects such as internal organ models.

Hydrogel Object

The hydrogel object is manufactured by the method of manufacturing a three-dimensional object of the present disclosure and at least one of 80 percent compressive stress-strain and modulus of elasticity has a continuous gradient.

As 80 percent compressive stress-strain of the hydrogel object, 10-10,000 kPa is preferable. When the 80 percent compressive stress-strain is 10 kPa or greater, shape-losing during forming is prevented. When the 80 percent compressive stress-strain is 100,000 kPa or less, cracking after forming is prevented. The 80 percent compressive stress-strain can be measured by, for example, a universal tester (AG-I, manufactured by Shimadzu Corporation).

The hydrogel object is preferably biocompatible in terms of application to the medical field, more preferably contains water as the main ingredient, and particularly preferably has different compression stresses and moduli of elasticity depending on the area therein.

"At least one of 80 percent compressive stress-strain and modulus of elasticity has continuous gradients" is that the 80 percent compressive stress-strain and the modulus of elasticity are controlled for each area in the hydrogel object and at least one of the 80 percent compressive stress-strain and the modulus of elasticity constantly increases or decreases in multiple areas.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Manufacturing Example 1 of First Liquid and Second Liquid

Preparation of Liquid A

Pure water was prepared by evacuating deionized water for 30 minutes.

While stirring 60 percent by mass of pure water, 6 percent by mass of synthesized hectorite (laponite XLG, manufactured by RockWood) having a composition of $[Mg_{5.34}Li_{0.66}Si_8O_{20}(OH)_4]Na^-_{-0.66}$ as laminate clay mineral was slowly added to the pure water followed by stirring to prepare a first liquid dispersion. Next, 0.3 percent by mass of etidronic acid (manufactured by Tokyo Chemical Industry Co. Ltd.) as the dispersant for the synthesized hectorite was added to the first liquid dispersion to obtain a second liquid dispersion.

Next, to the second liquid dispersion, 22 percent by mass of acryloyl morpholine (ACMO, manufactured by KJ Chemicals Corporation) from which a polymerization inhibitor was removed by passing through active alumina column was added as the curable material.

Furthermore, 0.2 percent by mass of N,N'-methylene bisacrylamide (MBAA, manufactured by Tokyo Chemical Industry Co. Ltd.) was added as a cross-linking agent. 10.2 percent by mass of glycerin (manufactured by Sakamoto Yakuhin kogyo Co., Ltd.) as a drying retardant and 0.3 percent by mass of LS106 (manufactured by Kao Corporation) as a surfactant were admixed.

Next, after 0.4 percent by mass of a photopolymerization promotor {N,N,N',N'-tetramethylethylene dimaine (TEMED, manufactured by Tokyo Chemical Industry Co. Ltd.)} was added and 0.6 percent by mass of photopolymerization initiator {4 percent by mass of Irgacure 184 (manufactured by BASF) and 96 percent by mass of methanol} were admixed and stirred. Subsequent to the stirring and mixing, the resultant was evacuated for ten minutes. Subsequently, impurities were removed by filtration to obtain a uniform liquid A.

Surface tension and viscosity of the thus-obtained liquid A were measured in the following manner. The surface tension was 30.0 mN/m and the viscosity was 6.5 mPA·s at 25 degrees C.

Measuring of Surface Tension

The surface tension of the thus-obtained liquid A was measured by a surface tensiometer (automatic contact angle meter DM701, manufactured by Kyowa Interface Science Co., LTD.) according to hanging drop method.

Measuring of Viscosity

The viscosity of the liquid A was measured by a rotation viscometer (VISCOMATE VM-150 III, manufactured by TOKI SANGYO CO., LTD.) in a 25 degrees C. environment.

Manufacturing Examples 2 to 9 of First Liquid and Second Liquid

Preparation of Liquid B to Liquid I

Liquid B to Liquid I were obtained in the same manner as in Manufacturing Example 1 of the first liquid and the second liquid except that the compositions and the amounts were changed as shown in Table 1.

Surface tension and viscosity of the thus-obtained liquid B to liquid I were measured in the same manner as in Manufacturing Example 1 of the first liquid and the second liquid.

The compositions and the properties of Liquid A to Liquid I were shown in Table 1.

TABLE 1

| | | First liquid and second liquid | | | | | | | | |
|---|---|---|---|---|---|---|---|---|---|---|
| | | A | B | C | D | E | F | G | H | I |
| Solvent | Pure water | 60 | 87.2 | 60.2 | 60 | 60 | 66.3 | — | — | — |
| | Toluene | — | — | — | — | — | — | 60 | 85 | 82.6 |
| Viscosity modifier | Propylene alcohol | — | — | — | — | — | — | 8.8 | 15 | 15 |
| Drying retardant | Glycerin | 10.2 | 10.2 | 10.2 | 10.2 | 10.2 | 10.2 | — | — | — |
| Surfactant | LS106 | 0.3 | 0.3 | 0.3 | 0.3 | 0.3 | 0.3 | — | — | — |
| Dispersant | etidronic acid | 0.3 | 0.3 | 0.3 | 0.3 | 0.3 | 0.3 | — | — | — |
| Polymerization initiator | Photopolymerization initiator liquid | 0.6 | — | 0.6 | 0.6 | 0.6 | 0.6 | 0.6 | — | — |
| | Thermal polymerization initiator liquid 1 | — | 2 | — | — | — | — | — | — | — |
| | Thermal polymerization initiator liquid 2 | — | — | — | — | — | — | — | — | 2 |
| Polymerization promoter | N,N,N',N'-tetramethyl ethylene diamine | 0.4 | — | 0.4 | 0.4 | 0.4 | 0.4 | 0.4 | — | 0.4 |
| Mineral | Laponite | 6 | — | 6 | 6 | 6 | — | — | — | — |
| Curable material | Acryloyl morpholine | 22 | — | 22 | 22 | — | 22 | 30 | — | — |
| | N,N-dimethyl acrylamide | — | — | — | — | 22 | — | — | — | — |

TABLE 1-continued

|  |  | First liquid and second liquid | | | | | | | | |
|---|---|---|---|---|---|---|---|---|---|---|
|  |  | A | B | C | D | E | F | G | H | I |
| Organic cross-linking agent | N,N'-methylene bisacrylamide | 0.2 | — | — | 0.2 | 0.2 | 0.2 | 0.2 | — | — |
| Total (percent by mass) | | 100 | 100 | 100 | 100 | 100 | 100 | 100 | 100 | 100 |
| Viscosity (mPa · s) | | 6.5 | 4.8 | 6.5 | 6.8 | 6.5 | 4.6 | 7.8 | 6.2 | 6.3 |
| Surface tension (mN/m) | | 30.0 | 29.8 | 29.9 | 30.1 | 30.0 | 30.0 | 29.8 | 29.3 | 29.3 |

In Table 1, the product name and the manufacturing company of the ingredients are as follows:

Toluene: solvent (manufactured by Wako Pure Chemical Industries, Ltd.)

Propyleneglycol: viscosity modifier (manufactured by Wako Pure Chemical Industries, Ltd.)

Glycerin: drying retardant (manufactured by Sakamoto Yakuhin kogyo Co., Ltd.)

LS106: surfactant (manufactured by Kao Corporation)

Etidronic acid: dispersant (manufactured by Tokyo Chemical Industry Co. Ltd.)

Photopolymerization initiator: 4 percent by mass Irgacure 184 (manufactured by BASF) and 96 percent by mass methanol Thermal polymerization initiator 1: 2 percent by mass peroxo sodium pyrosulfate and 98 percent by mass pure water Thermal polymerization initiator 2: 2,2'-azobis(2,4-dimethylvaloronitrile)

Laponite XLG: (laminate clay mineral, manufactured by Rockwood)

Acryloylmorpholine (ACMO): manufactured by KJ Chemicals Corporation

N, N-dimethylacrylamide (DMAA), manufactured by KJ Chemicals Corporation

N, N'-methylene bisacrylamide (MBAA): manufactured by Tokyo Chemical Industry Co. Ltd.

N, N, N',N'-tetramethylethylene dimaine (TEMED): polymerization promoter (manufactured by Tokyo Chemical Industry Co. Ltd.)

Example 1

Liquid A was used as the first liquid and Liquid B was used as the second liquid.

A three-dimensional object as hydrogel object containing water as the main ingredient as illustrated in FIG. 1 was obtained by conducting the following process 1 to process 4 using the liquid A and the liquid B.

1. The liquid A and the liquid B were mixed with a mass ratio of 2:1 (liquid A:liquid B) and poured in a mold having a dimension of 30 mm (depth)×30 mm (width)×8 mm (height) until the height of the mixture reached 2 mm, that is, 7.2 cube centi-meter. The mixture was left undone for 6 hours at 27 degrees C. to manufacture the first layer of a hydrogel.

2. Next, the liquid A and the liquid B were mixed with a mass ratio of 1:1 (liquid A:liquid B) and 7.2 cube centi-meter thereof was poured on the first layer in the mold having a dimension of 30 mm (depth)×30 mm (width)×8 mm (height). The mixture was left undone for 6 hours at 27 degrees C. to manufacture a second layer.

3. Next, the liquid A and the liquid B were mixed with a mass ratio of 1:2 (liquid A:liquid B) and 7.2 cube centi-meter thereof was poured on the second layer in the mold having a dimension of 30 mm (depth)×30 mm (width)×8 mm (height). The mixture was left undone for 6 hours at 27 degrees C. to manufacture a third layer.

4. Finally, the liquid A and the liquid B were mixed with a mass ratio of 1:3 (liquid A:liquid B) and 7.2 cube centi-meter thereof was poured on the second layer in the mold having a dimension of 30 mm (depth)×30 mm (width)×8 mm (height). The mixture was left undone for 12 hours at 27 degrees C. to manufacture a fourth layer to obtain a three-dimensional object (hydrogel object) containing water as the main ingredient.

The structure of the thus-obtained hygrogel is schematically shown in Table 1.

Figure 2:
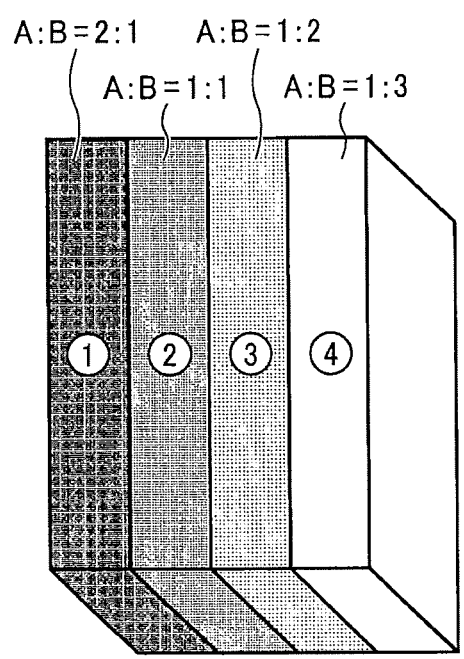
FIG. 2 is a diagram illustrating a view of the hydrogel object illustrated in FIG. 1 when the hydrogel object stands on its side.

To measure modulus of elasticity of each layer of the three-dimensional object (hydrogel object) containing water of the thus-obtained four-layer structure as the main ingredient, the three-dimensional object containing water as the main ingredient was placed on the side as illustrated in FIG. 2 and cylindrical metal having a diameter of 1 mm was pressed into the hydrogel object containing water as the main ingredient from above using a compression tester. The stress was measured at three points N1, N2, and N3 for each layer by the compression tester. Thus, the modulus of elasticity under 20 percent compression was measured for each layer. The results are shown in Table 2.

TABLE 2

| Layer number | Mass ratio (A:B) | 20 percent modulus of elasticity (MPa) | | |
|---|---|---|---|---|
|  |  | N1 | N2 | N3 |
| 1 | 2:1 | 0.26 | 0.24 | 0.26 |
| 2 | 1:1 | 0.10 | 0.09 | 0.09 |
| 3 | 1:2 | 0.03 | 0.03 | 0.03 |
| 4 | 1:3 | 0.01 | 0.01 | 0.01 |

As seen in the results of Table 2, when the mass ratio of the liquid A and the liquid B is changed for each layer, each layer is found to have a different modulus of elasticity. The degree of modulus of elasticity is shown by shading. As the modulus of elasticity increases, the density (shade) increases.

When a hydrogel layer was overlaid while changing the mass ratio (liquid A:liquid B) of the liquid A and the liquid B in the mold as illustrated in FIG. 1, a three-dimensional object (hygrogel object) containing water as the main ingredient free of layer peeling off was obtained. Furthermore, when the modulus of elasticity was measured as illustrated in FIG. 2, it was found that a hydrogel object containing

Example 2

The liquid A (forming liquid) was used as the first liquid and the liquid B (diluting liquid) was used as the second liquid.

Figure 3:
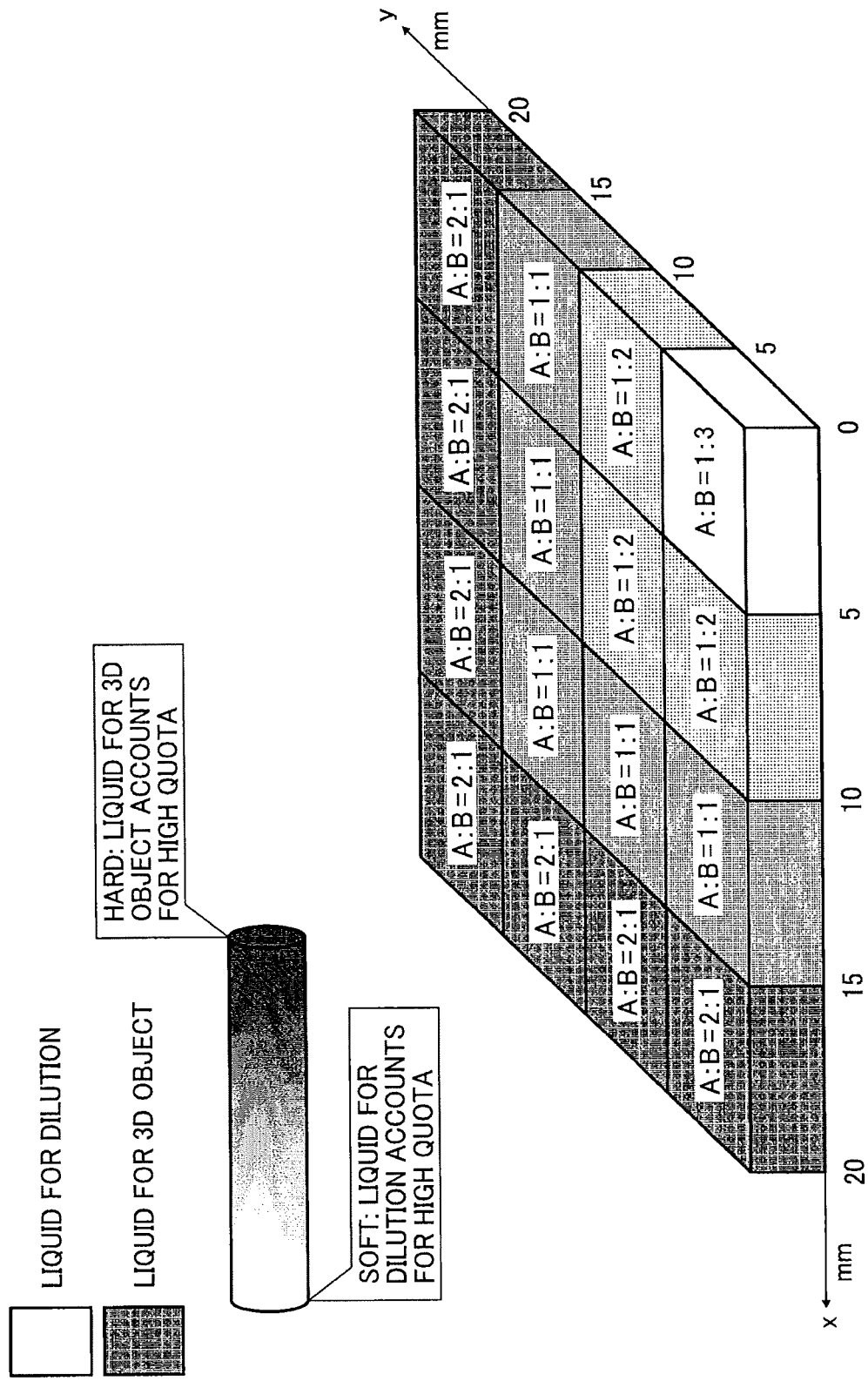
FIG. 3 is a schematic diagram illustrating an example of the mass ratio distribution of the first liquid and the second liquid in the hydrogel object (three-dimensional object) of Example 2 described later containing water as the main ingredient.

The inkjet heads (MH5420, manufactured by Ricoh Industry Company, Ltd.) were filled with the liquid A and the liquid B and discharged them in 300 dpi×300 dpi. The volume of droplets discharged was controlled to change the mass ratio (liquid A:liquid B) as illustrated in FIG. 3 to obtain a three-dimensional object (hydrogel object) containing water as the main ingredient. FIG. 3 is a diagram illustrating the mixing ratio distribution in which the volume of the droplets of the liquid A and the liquid B in a single area in the three-dimensional object (hydrogel object) containing water as the main ingredient.

To be specific, four heads were used for the first liquid and another four was used for the second liquid to discharge the liquid A and the liquid B. The total amount of the liquid imparted on the single area was controlled to be 144 pL.

For example, the liquid volume was changed in such a manner that the ratio of the volume of a droplet of the liquid A and the volume of a droplet of the liquid B was 24 pL:120 pL, 48 pL:96 pL, and 72 pL:72 pL to form a film including a hydrogel. Thereafter, the film was cured by light emitted by an ultraviolet ray irradiaor (SPOT CURE SP5-250DB, manufactured by USHIO INC.) in a light amount of 350 mJ/cm$^2$. A hundred layers were formed in the same manner and cured to manufacture a three-dimensional object (hydrogel object) containing water as the main ingredient. Thus, a hydrogel object containing water as the main ingredient with a dimension of 20 mm (depth)×20 mm (width)×2 mm (height) free of layer peel-off was obtained.

The modulus of elasticity under 20 percent compression of the hydrogel object containing water as the main ingredient was measured. The modulus of elasticity was measured by using a universal tester (AG-I, manufactured by Shimadzu Corporation), a load cell 1 kN, and compression jig for 1 kN while pressing cylindrical metal having a diameter of 1 mm into the hydrogel object containing water as the main ingredient. The stress against the compression applied to the load cell was recorded in a computer and the stress against displacement was plotted to measure the modulus of elasticity. In addition, the pressed-in area was an area (x,y) of the hydrogel object containing water as the main ingredient and the modulus of elasticity was measured for each area of 2 mm×2 mm while changing both x and y from 0 to 20 in FIG. 3.

Figure 4:
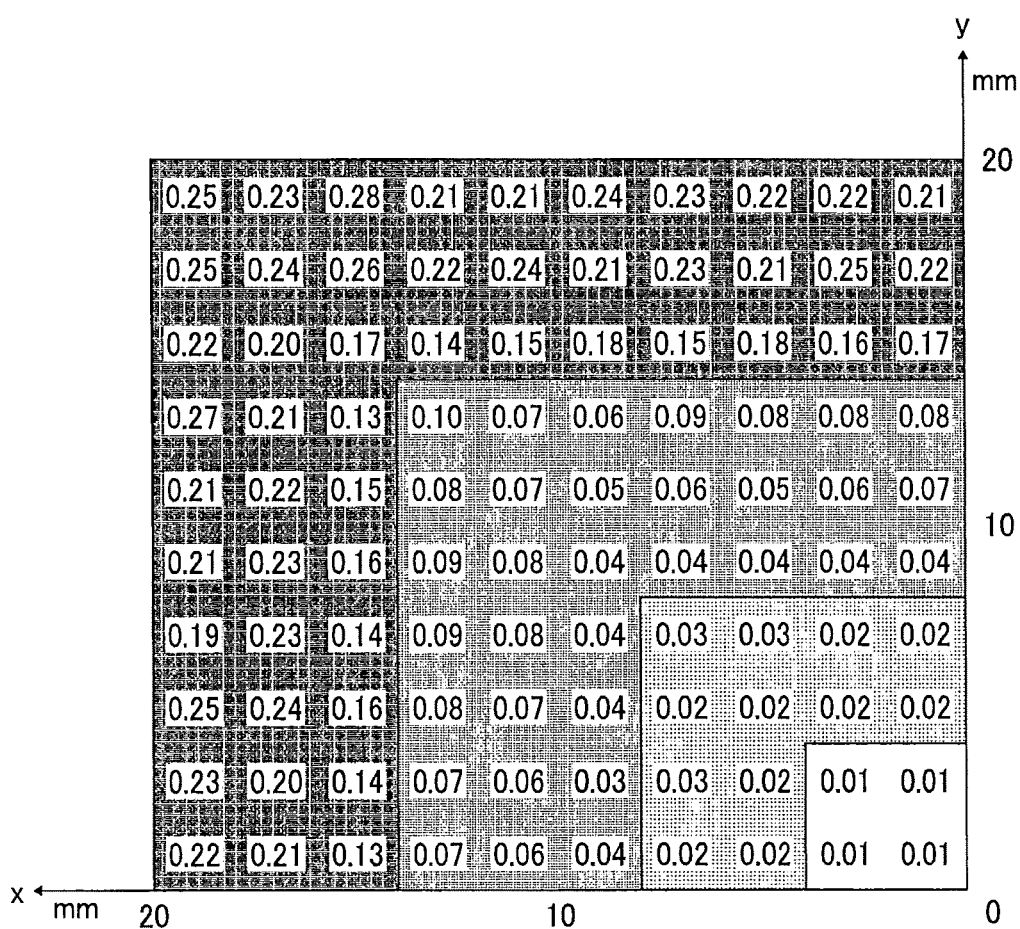
FIG. 4 is a schematic diagram illustrating the modulus of elasticity distribution under 20 percent compression in FIG. 3.

The measuring results of modulus of elasticity are shown in Table 3 and FIG. 4. FIG. 4 is a diagram illustrating the values of modulus of elasticity for each area of 2 mm×2 mm in the hydrogel object containing water as the main ingredient illustrated in FIG. 3. The area of film of each mass ratio (liquid A:liquid B) of FIG. 3 corresponds to the area of the value of the modulus of elasticity under 20 percent compression in FIG. 4. The modulus of elasticity under 20 percent compression is a gradient of the compression stress under 20 percent compression.

As seen in the results of Table 3 and FIG. 4, when the volumes of droplets of the liquid A and the liquid B were changed to control the mass ratio (liquid A:liquid B), a three-dimensional object (hydrogel object) containing water as the main ingredient which had multiple areas having different values of modulus of elasticity as shown in Table 2 was obtained.

Example 3

The liquid A (forming liquid) was used as the first liquid and the liquid B (diluting liquid) was used as the second liquid.

Figure 5:
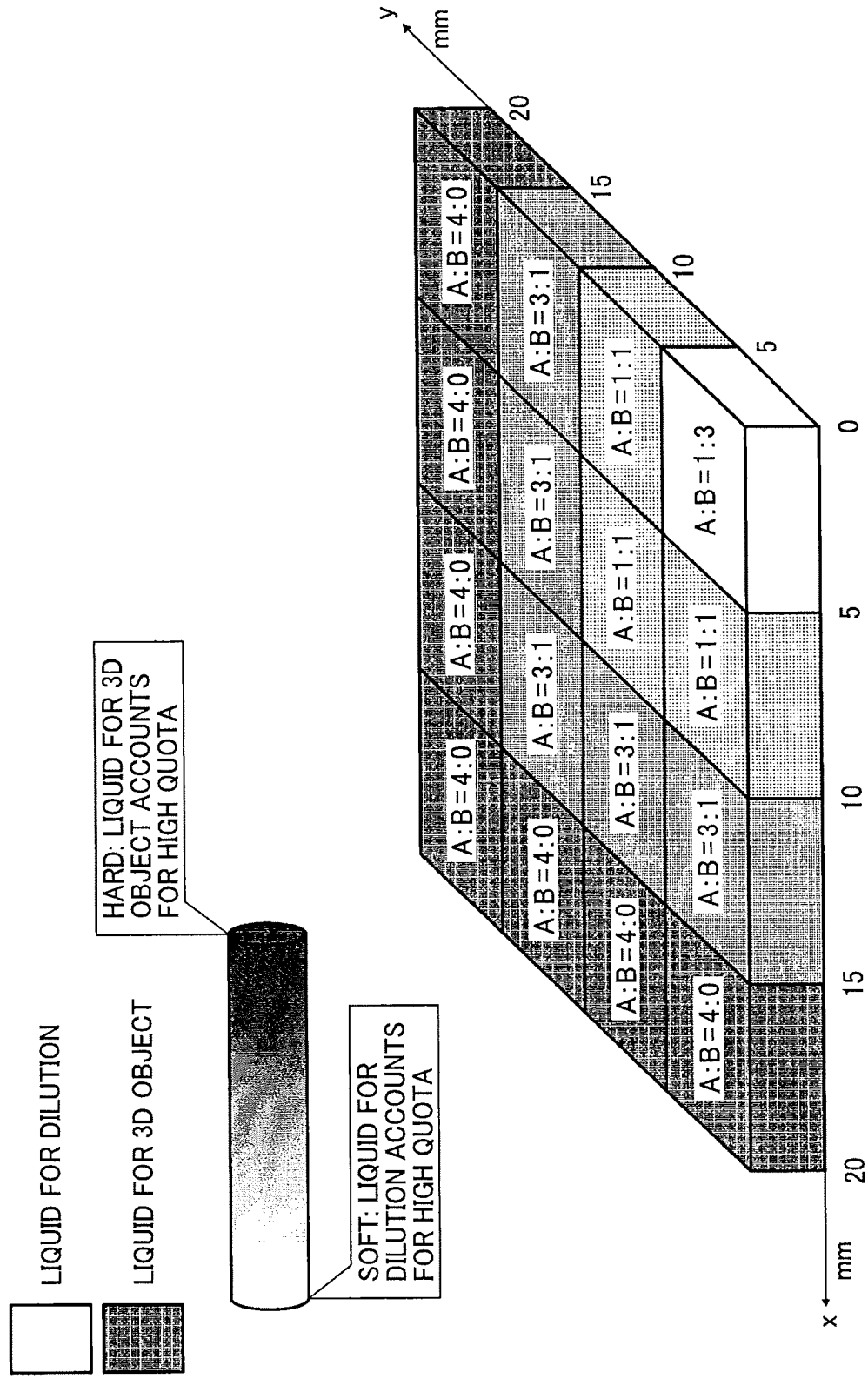
FIG. 5 is a schematic diagram illustrating an example of the mass ratio distribution of the first liquid and the second liquid in the hydrogel object (three-dimensional object) of Example 3 described later containing water as the main ingredient.

The inkjet heads (MH5420, manufactured by Ricoh Industry Company, Ltd.) were filled with the liquid A and the liquid B and discharged them in 300 dpi×300 dpi. The number of droplets to be discharged was changed to change the mass ratio (liquid A:liquid B) in each area as illustrated in FIG. 5 to manufacture a three-dimensional object (hydrogel object) containing water as the main component. FIG. 5 is a diagram illustrating the mixing ratio distribution in which the number of the droplets of the liquid A and the liquid B in a single area in the three-dimensional object (hydrogel object) containing water as the main component.

To be specific, four heads were used for the first liquid and another four was used for the second liquid to discharge the liquid A and the liquid B. The total amount of the liquid imparted on the single area was controlled to be 144 pL.

The volume of a single droplet was determined to be 36 pL and four droplets were discharged for the single area. For example, the number of droplets was controlled in such a manner that the ratio of the number of droplets of the liquid A and the number of droplets of the liquid B in a single area was 1:3, 2:2, 3:1, and 4:0 to form a film including a three-dimensional object (hydrogel object) containing water as the main ingredient. Thereafter, the film was cured by light emitted by an ultraviolet ray irradiaor (SPOT CURE SP5-250DB, manufactured by USHIO INC.) in a light amount of 350 mJ/cm$^2$. A hundred layers were formed and cured in the same manner to manufacture a three-dimensional object (hydrogel object) containing water as the main ingredient. Thus, a hydrogel object containing water as the main ingredient with a dimension of 20 mm (depth)×20 mm (width)×2 mm (height) free of layer peel-off was obtained.

The modulus of elasticity under 20 percent compression of the thus-obtained hydrogel object containing water as the main component was measured.

The modulus of elasticity under 20 percent compression was measured in the same manner as described in Example 2. The measuring results are shown in Table 3 and FIG. 6.

Figure 6:
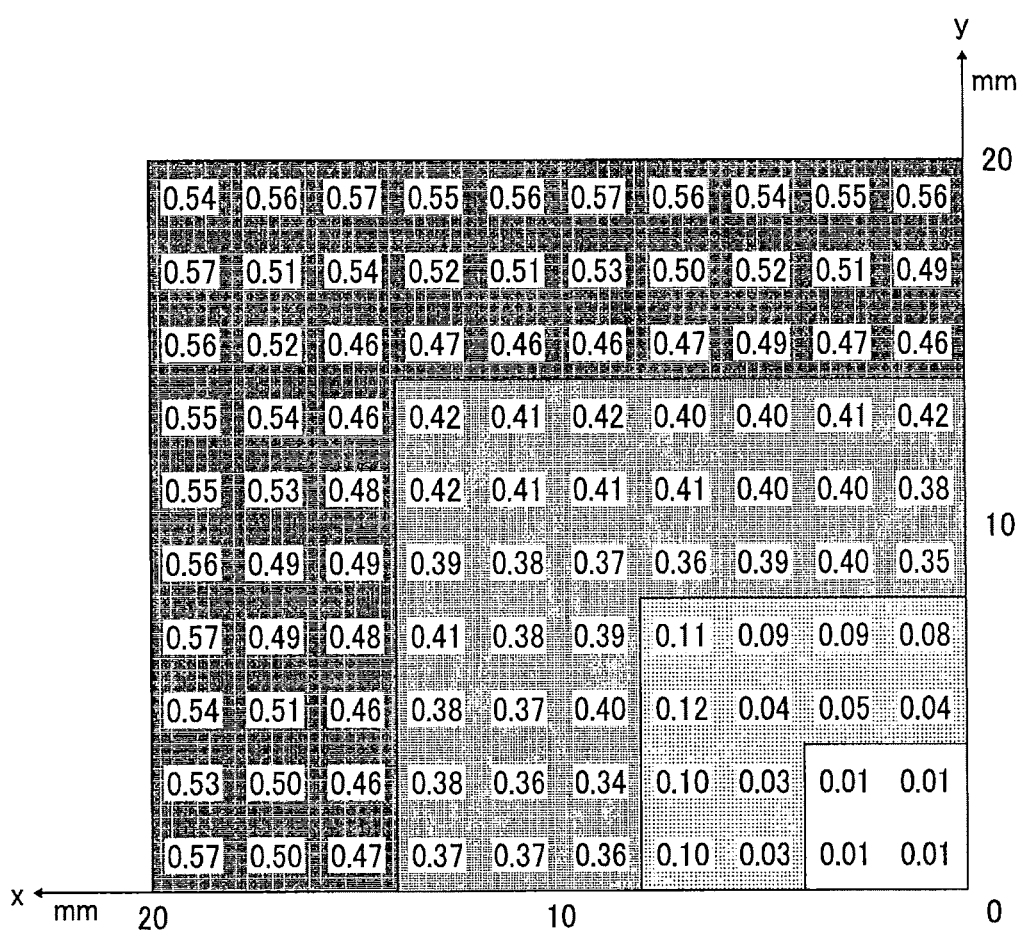
FIG. 6 is a schematic diagram illustrating the modulus of elasticity distribution under 20 percent compression in FIG. 5.

FIG. 6 is a diagram illustrating the values of modulus of elasticity for each area of 2 mm×2 mm in the hydrogel object containing water as the main ingredient illustrated in FIG. 5.

The area of film of each mass ratio (liquid A:liquid B) of FIG. 5 corresponds to the area of the values of the modulus of elasticity under 20 percent compression in FIG. 6.

As seen in the results of Table 3 and FIG. 6, when the mass ratio (liquid A:liquid B) of the liquid A and the liquid B, namely, the number of droplets of the liquid A and the liquid B, was changed as illustrated in FIG. 5, the modulus of elasticity under 20 percent compression was easily changed as illustrated in FIG. 6.

Unlike Example 1, a three-dimensional object (hydrogel object) containing water as the main ingredient was manufactured having multiple areas with continuously different modulus of elasticity in a layer.

Example 4

The liquid F (forming liquid) was used as the first liquid and the liquid B (diluting liquid) was used as the second liquid.

Figure 7:
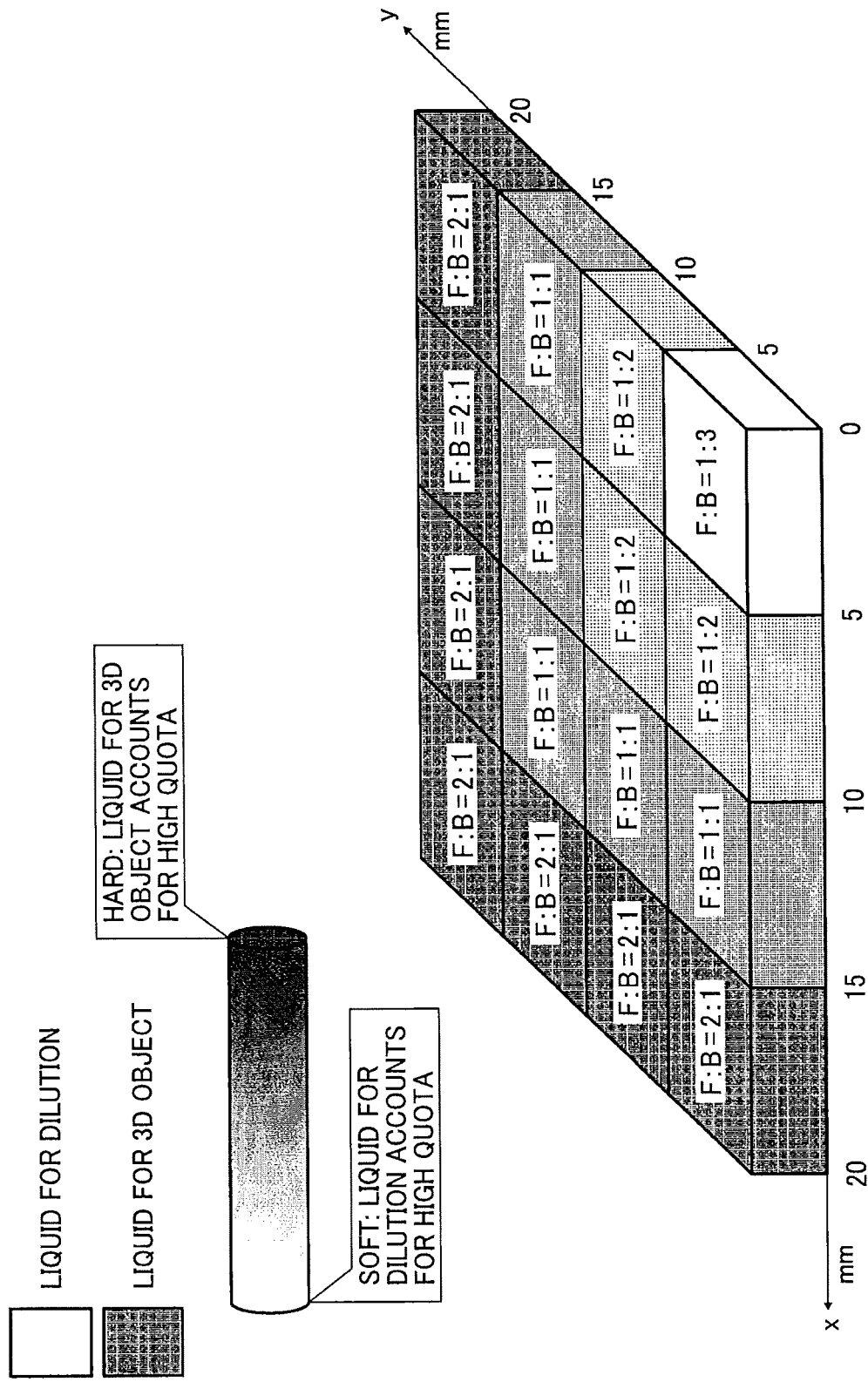
FIG. 7 is a schematic diagram illustrating an example of the mass ratio distribution of the first liquid and the second liquid in the hydrogel object (three-dimensional object) of Example 4 described later containing water as the main ingredient.

The inkjet heads (MH5420, manufactured by Ricoh Industry Company, Ltd.) were filled with the liquid F and the liquid B and discharged them in 300 dpi×300 dpi. The volume of a droplet of discharged was controlled to change the mass ratio (liquid F:liquid B) as illustrated in FIG. 7 to obtain a three-dimensional object (hydrogel object) containing water as the main ingredient. FIG. 7 is a diagram illustrating the mixing ratio distribution in which the volume of the droplet of the liquid F and the liquid B in a single area in the three-dimensional object (hydrogel object) containing water as the main ingredient.

To be specific, four heads were used for the first liquid and another four was used for the second liquid to discharge the liquid F and the liquid B. The total amount of the liquid imparted on the single area was controlled to be 144 pL.

For example, the liquid droplet volume was changed in such a manner that the ratio of the volume of a droplet of the liquid F and the volume of a droplet of the liquid B was 24 pL:120 pL, 48 pL:96 pL, and 72 pL:72 pL to form a liquid film including a hydrogel containing water as the main ingredient. Thereafter, the liquid film was cured by light emitted by an ultraviolet ray irradiaor (SPOT CURE SP5-250DB, manufactured by USHIO INC.) in a light amount of 350 mJ/cm$^2$. A hundred layers were formed and cured in the same manner to manufacture a three-dimensional object (hydrogel object) containing water as the main ingredient. Thus, a hydrogel object containing water as the main ingredient with a dimension of 20 mm (depth)×20 mm (width)×2 mm (height) free of layer peel-off was obtained.

Figure 8:
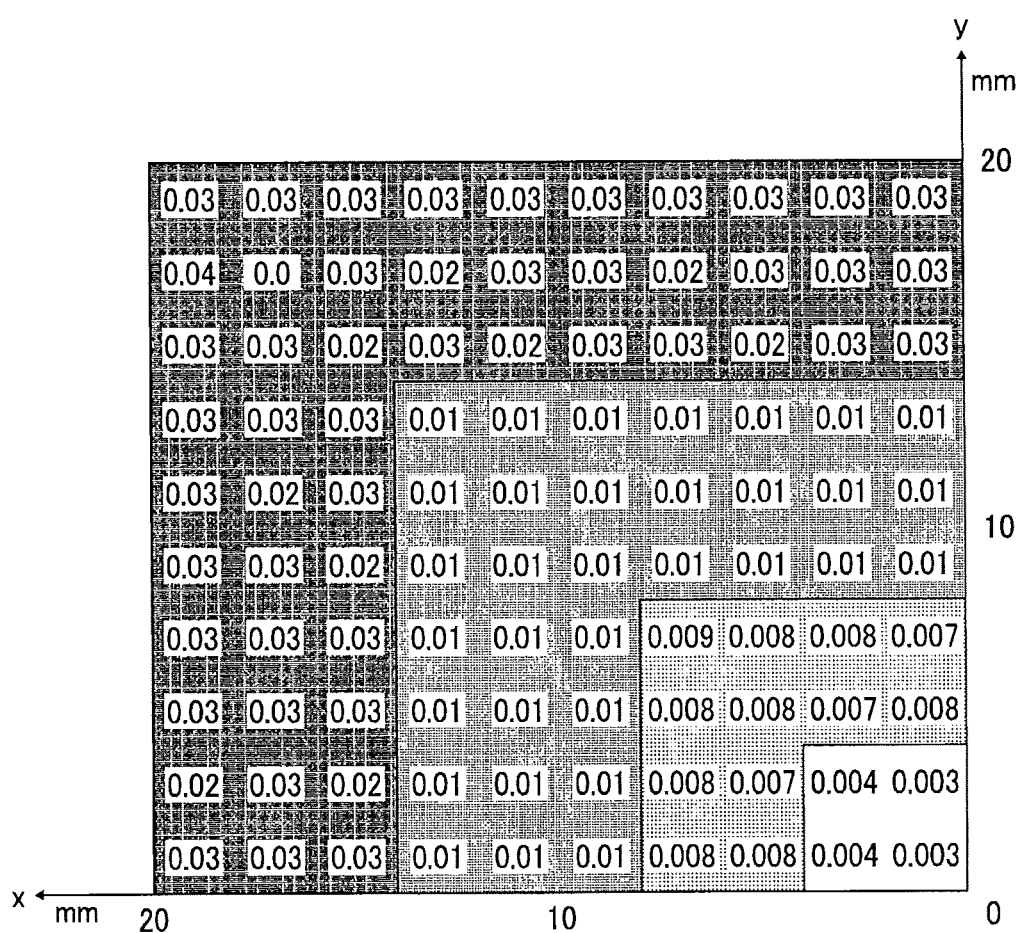
FIG. 8 is a schematic diagram illustrating the modulus of elasticity distribution under 20 percent compression in FIG. 7.

The modulus of elasticity under 20 percent compression of the thus-obtained hydrogel object containing water as the main ingredient was measured in the same manner as in Example 2. The measuring results of the modulus of elasticity are shown in Table 3 and FIG. 8. FIG. 8 is a diagram illustrating the values of modulus of elasticity for each area of 2 mm (depth)×2 mm (width) in the hydrogel object containing water as the main ingredient illustrated in FIG. 7. The area of film of each mass ratio (liquid F:liquid B) of FIG. 7 corresponds to the area of the value of the modulus of elasticity under 20 percent compression in FIG. 8.

As seen in the results of Table 3 and FIG. 8, when the mass ratio (liquid F:liquid B) of the liquid F and the liquid B was changed, the modulus of elasticity was changed.

Unlike Example 1, a three-dimensional object (hydrogel object) containing water as the main ingredient was manufactured having multiple areas with continuously different modulus of elasticity in a layer. However, it was found that, without laponite XLG, the obtained three-dimensional object contained a hygrogel having extremely low modulus of elasticity as the main ingredient.

Example 5

The liquid A (forming liquid) was used as the first liquid and the liquid B (diluting liquid) was used as the second liquid.

The liquid A and the liquid B were mixed changing the mass ratio (liquid A:liquid B) of the liquid A and the liquid B and the liquid mixture was poured in a mold having a dimension of 30 mm (depth)×30 mm (width)×8 mm (height). The mixture was left undone for 12 hours at 27 degrees C. to manufacture a three-dimensional object (hydrogel object) containing water as the main ingredient.

According to the same measuring manner as modulus of elasticity under 20 percent compression described in Example 1, compression stress under 70 percent compression (70 percent compressive stress-strain), compression stress under 80 percent compression (80 percent compressive stress-strain), and modulus of elasticity under 20 percent compression were measured.

Toughness of a three-dimensional object (hydrogel compression) containing water as the main ingredient can be evaluated by the compression stress under 70 percent compression and 80 percent compression. The results are shown in Table 9.

Figure 9:
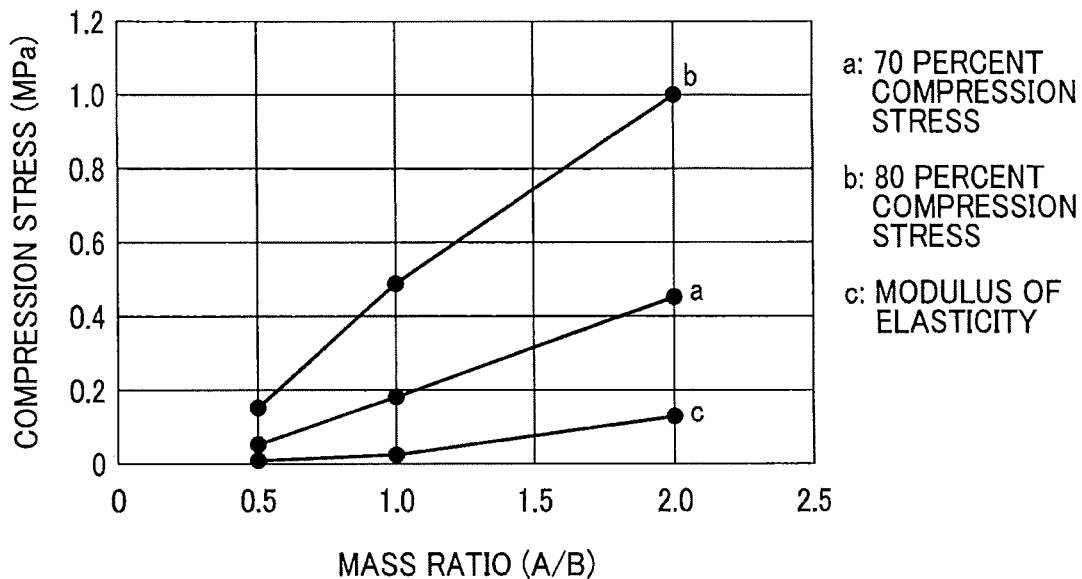
FIG. 9 is a graph illustrating an example of the change of modulus of elasticity and compression stress when the mass ratio of the first liquid and the second liquid in the hydrogel object (three-dimensional object) of Example 5 described later containing water as the main ingredient is changed.

As described in FIG. 9, as the ratio of the liquid A increased, the compression stress of a three-dimensional object (hydrogel object) containing water as the main ingredient was found to increase. Namely, it was found that, when the mass ratio of the liquid A and the liquid B was changed, the compression stress of a three-dimensional object (hydrogel object) containing water as the main ingredient was easily changed.

It was also found that, when the imparting amount of each liquid of the liquid set for manufacturing a three-dimensional object was controlled, it was possible to form a three-dimensional object (hydrogel object) containing water as the main ingredient and having multiple areas having different values of post-curing modulus of elasticity.

Example 6

The liquid C (forming liquid) was used as the first liquid and the liquid D (diluting liquid) was used as the second liquid.

The liquid C and the liquid D were mixed changing the mass ratio (liquid C:liquid D) of the liquid C and the liquid D as shown in Table 3 in the same manner as described in Example 1 and the liquid mixture was poured in a mold having a dimension of 30 mm (depth)×30 mm (width)×8 mm (height). The mixture was left undone for 12 hours at 27 degrees C. to manufacture a three-dimensional object (hydrogel object) containing water as the main ingredient. The compression stress under 70 percent compression, the compression stress under 80 percent compression, and the modulus of elasticity 20 percent compression of the thus-obtained hydrogel object containing water as the main ingredient were measured in the same manner as in Example 1. The measuring results are shown in Table 3 and FIG. 10.

Figure 10:
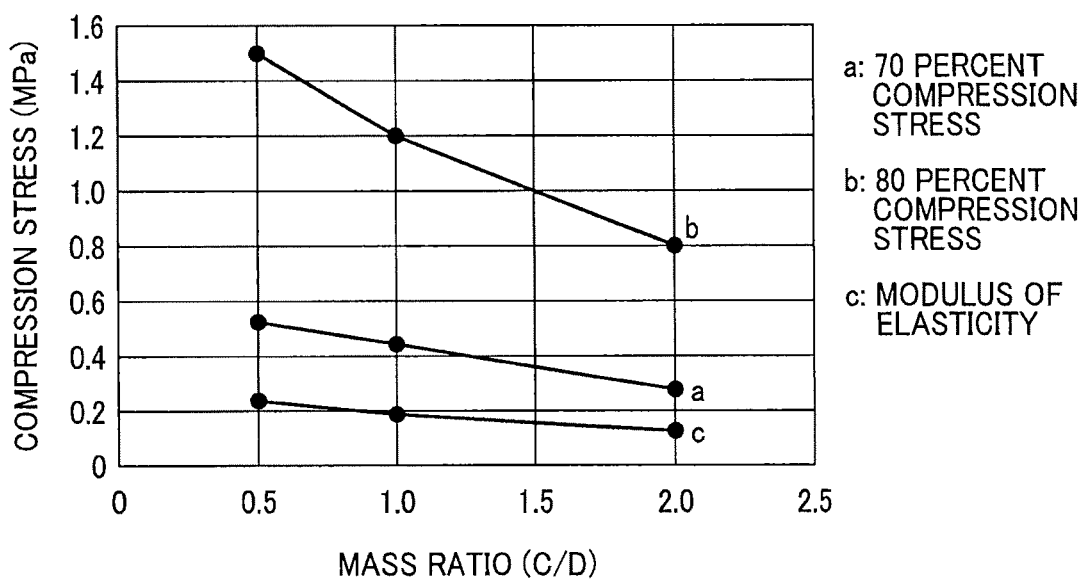
FIG. 10 is a graph illustrating an example of the change of modulus of elasticity and compression stress when the mass ratio of the first liquid and the second liquid in the hydrogel object (three-dimensional object) of Example 6 described later containing water as the main ingredient is changed.

As described in FIG. 10, as the ratio of the liquid D increased, the compression stress of a three-dimensional object (hydrogel object) containing water as the main ingredient also increased. Namely, it was found that, when the mass ratio of the liquid C and the liquid D was changed, the compression stress and modulus of elasticity of a three-dimensional object (hydrogel object) containing water as the main ingredient were easily changed.

It was also found that, when the imparting amount of each liquid of the liquid set for manufacturing a three-dimensional object was controlled, it was possible to form a three-dimensional object (hydrogel object) containing water as the main ingredient having multiple areas having different values of post-curing modulus of elasticity.

Example 7

The liquid A (forming liquid) was used as the first liquid and the liquid E (diluting liquid) was used as the second liquid.

The liquid A and the liquid E were mixed changing the mass ratio (liquid A:liquid E) of the liquid A and the liquid E and the liquid mixture was poured in a mold having a dimension of 30 mm (depth)×30 mm (width)×8 mm (height). The mixture was left undone for 12 hours at 27 degrees C. to manufacture a three-dimensional object (hydrogel object) containing water as the main ingredient. The compression stress under 70 percent compression, the compression stress 80 percent compression, and the modulus of elasticity under 20 percent compression of the thus-obtained hydrogel object containing water as the main ingredient were measured in the same manner as in Example 5. The measuring results are shown in Table 3 and FIG. 11.

Figure 11:
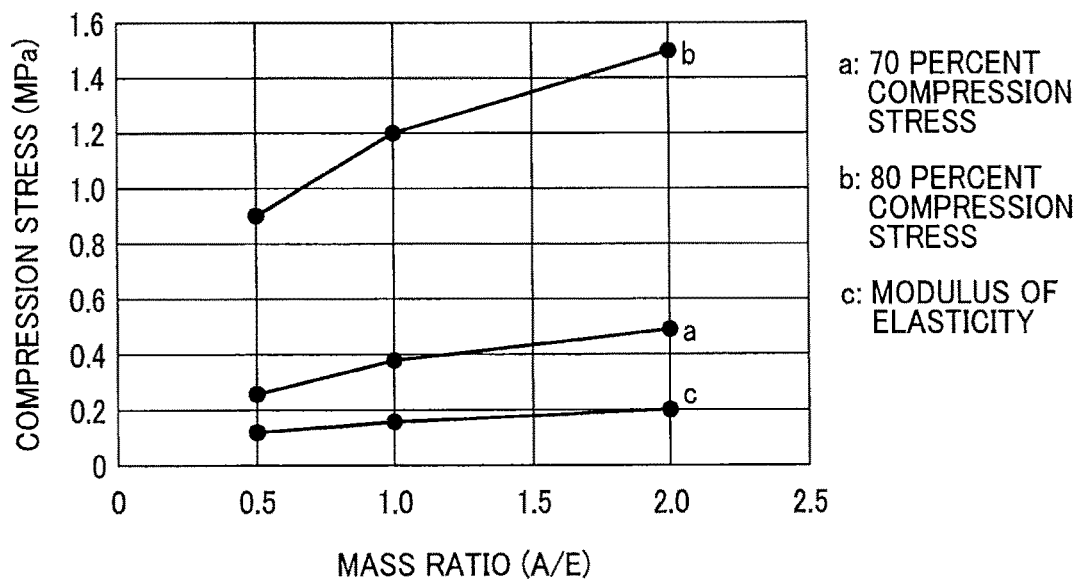
FIG. 11 is a graph illustrating an example of the change of modulus of elasticity and compression stress when the mass ratio of the first liquid and the second liquid in the hydrogel object (three-dimensional object) of Example 7 described later containing water as the main ingredient is changed.

As described in FIG. 11, as the ratio of the liquid E increased, the compression stress of a three-dimensional object (hydrogel object) containing water as the main ingredient decreased. Namely, it was found that, when the mass ratio of the liquid A and the liquid E was changed, the compression stress of a three-dimensional object (hydrogel object) containing water as the main ingredient was easily changed.

It was also found that, when the imparting amount of each liquid of the liquid set for manufacturing a three-dimensional object was controlled, it was possible to form a three-dimensional object (hydrogel object) containing water as the main ingredient having multiple areas having different values of post-curing modulus of elasticity.

Example 8

A non-contact dispenser (Cyber Jet 2, manufactured by MUSASHI ENGINEERING INC.) was used with twin heads. When Cyber Jet 2 was used with twin heads, the mixing ratio of two kinds of liquids can be precisely managed by the number of jetting.

The liquid A (forming liquid) was used as the first liquid and the liquid B (diluting liquid) was used as the second liquid.

Figure 12:
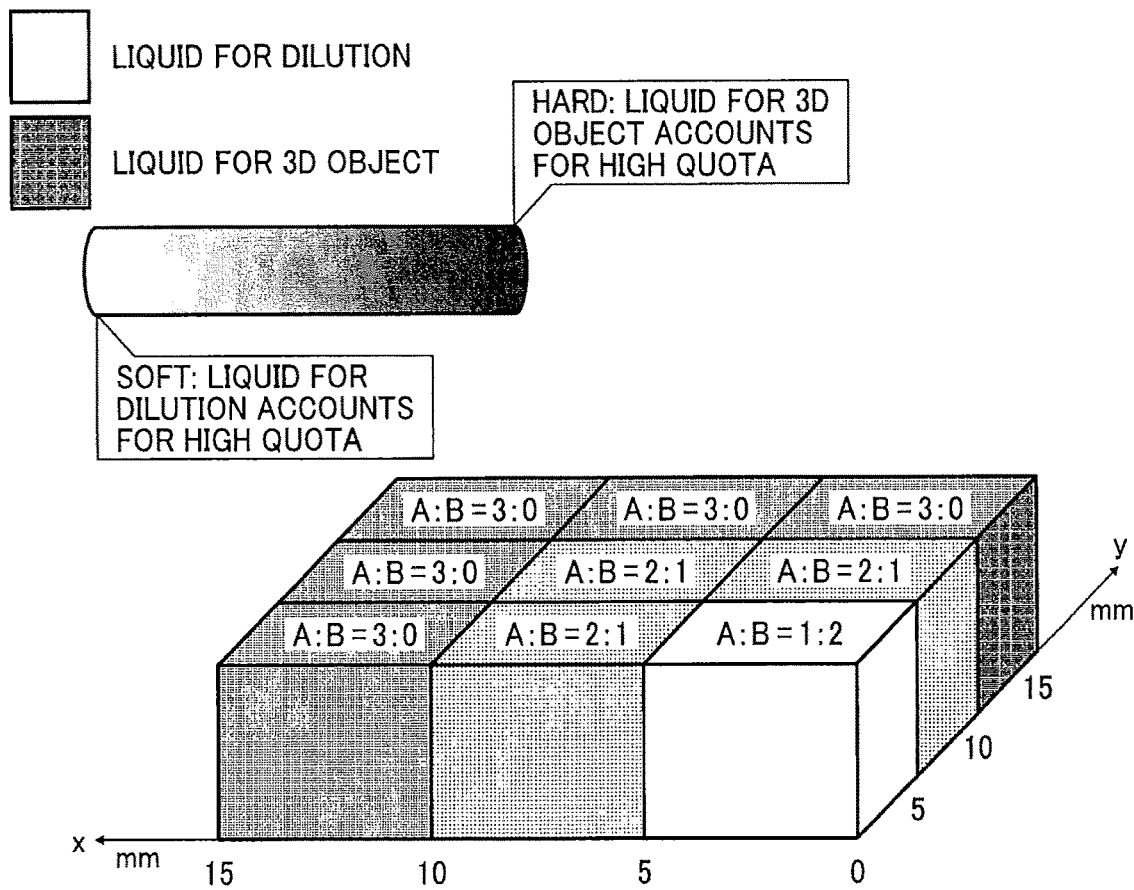
FIG. 12 is a schematic diagram illustrating an example of the mass ratio distribution of the first liquid and the second liquid in the hydrogel object (three-dimensional object) of Example 8 described later containing water as the main ingredient.

The dispenser 1 discharged the liquid A and the dispenser 2 discharged the liquid B at a rate of 0.03 mg per droplet The number of droplets to be discharged was changed to change the mass ratio (liquid A:liquid B) as illustrated in FIG. 12 to manufacture a three-dimensional object (hydrogel object) containing water as the main ingredient. FIG. 12 is a diagram illustrating the mixing ratio distribution in which the volume of the droplets of the liquid A and the liquid B in a single area in the three-dimensional object (hydrogel object) containing water as the main ingredient.

To be specific, the mass of the liquid discharged to the single area of 5 mm (depth)×5 mm (width)×5 mm (height) was 0.09 mg, namely, equivalent to the amount of three droplets. For example, the discharging volume of the liquid droplet was changed in such a manner that the ratio of the number of liquid droplets of the liquid A to the number of liquid droplets of the liquid B was 3:0, 2:1, and 1:2. The liquid mixture was irradiated and cured with light emitted by an ultraviolet ray irradiaor (SPOT CURE SP5-250DB, manufactured by USHIO INC.) in a light amount of 350 mJ/cm$^2$ to form a three-dimensional object (hydrogel object). Thus, the three-dimensional object (hydrogel object) containing water as the main ingredient with a dimension of 15 mm (depth)×15 mm (width)×5 mm (height) free of layer peel-off was obtained. The modulus of elasticity under 20 percent compression of the hydrogel object containing water as the main ingredient was measured in the same manner as in Example 2. In addition, the pressed-in area of a cylindrical metal having a diameter of 1 mm was each area (x, y) of 2.5 mm×2.5 mm of the hydrogel object containing water as the main ingredient while changing both x and y from 0 to 15. The measuring results are shown in Table 3 and FIG. 13.

Figure 13:
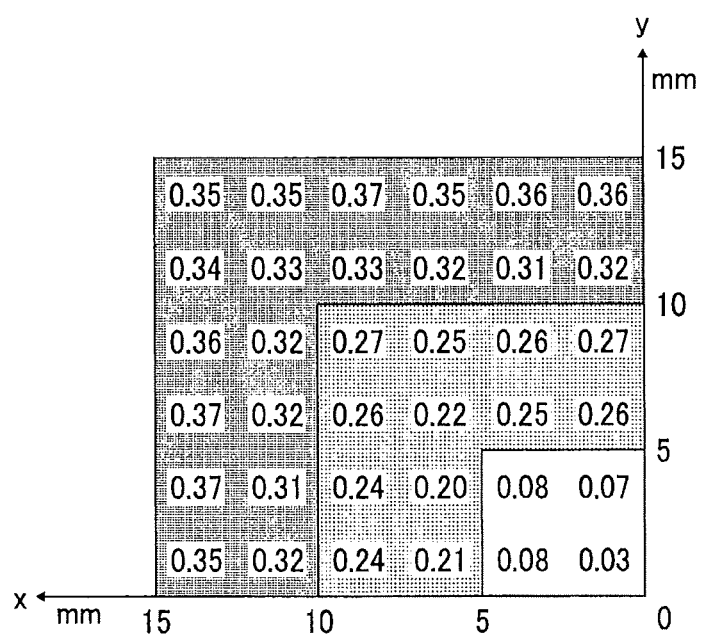
FIG. 13 is a schematic diagram illustrating the modulus of elasticity distribution under 20 percent compression in FIG. 12.

The area of the film of each mass ratio (liquid A:liquid B) of FIG. 12 corresponds to the area of the value of the modulus of elasticity under 20 percent compression in FIG. 13.

As seen in the results of FIG. 13, when the mass ratio (liquid A:liquid B) of the liquid A and the liquid B, namely, the number of droplets, was changed as illustrated in FIG. 12, the modulus of elasticity was easily changed as illustrated in FIG. 13.

Unlike Example 1, a three-dimensional object (hydrogel object) containing water as the main ingredient was manufactured having multiple areas with continuously different compression stress in a layer.

Example 9

The liquid G (forming liquid) was used as the first liquid and the liquid H (diluting liquid) was used as the second liquid.

Figure 14:
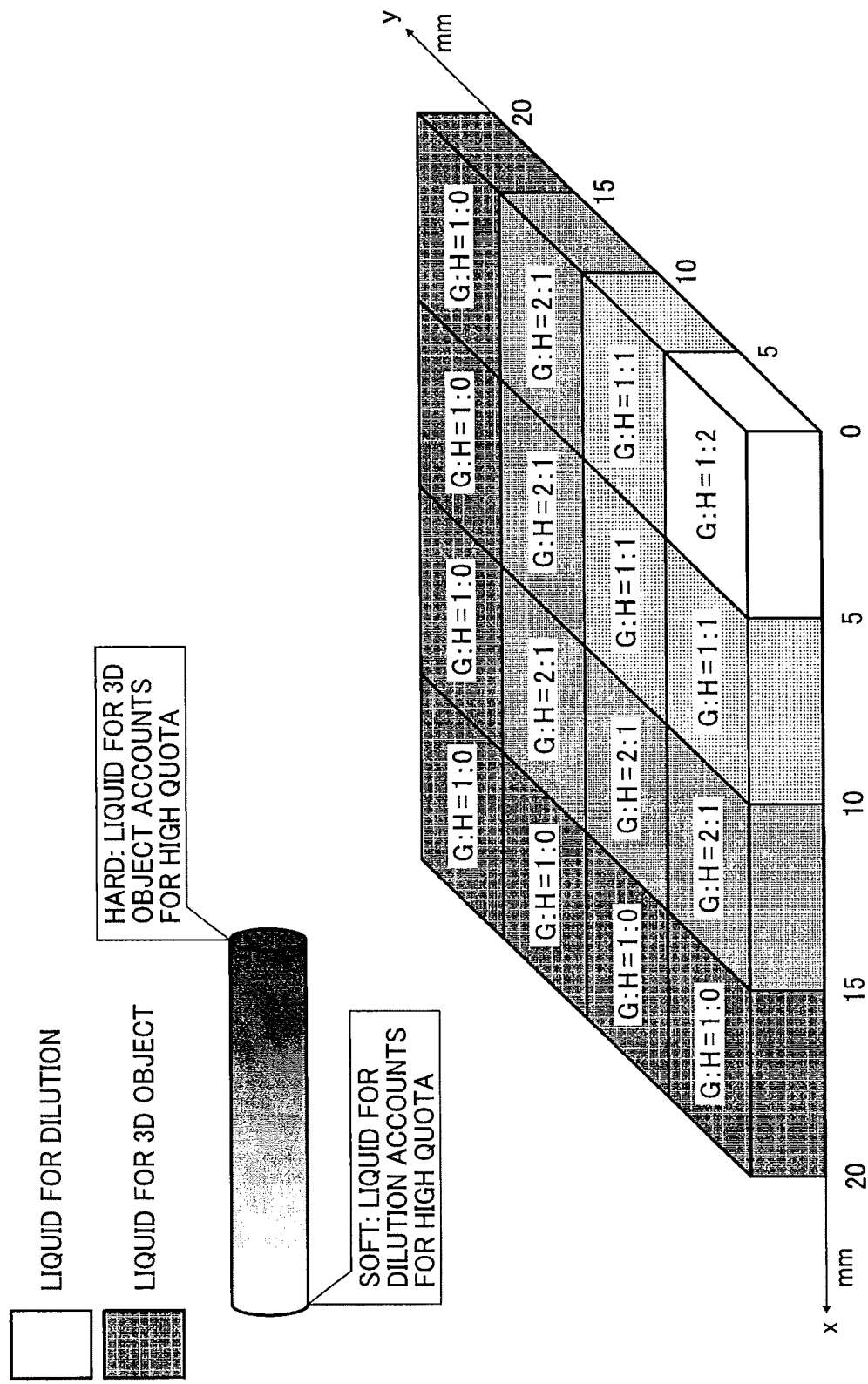
FIG. 14 is a schematic diagram illustrating an example of the mass ratio distribution of the first liquid and the second liquid in the oil object (three-dimensional object) of Example 9.

The inkjet head (MH5420, manufactured by Ricoh Industry Company Ltd.) was filled with the liquid G and the liquid H and discharged them. The volume of droplets discharged was changed to change the mass ratio (liquid G:liquid H) as illustrated in FIG. 14 to obtain an oil gel. FIG. 14 is a diagram illustrating the mixing ratio distribution in which the volume of the droplets of the liquid G and the liquid H in a single area in the oil gel.

To be specific, four inkjet heads (MH5420, manufactured by Ricoh Industry Company Ltd.) were filled with the liquid G and another four were filled with the liquid H to discharge them. The total amount of the liquid imparted on the single area was controlled to be 144 pL.

For example, the liquid volume was changed in such a manner that the ratio of the volume of a droplet of the liquid G and the volume of a droplet of the liquid H was 24 pL:120 pL, 48 pL:96 pL, and 72 pL:72 pL to form a liquid film of an oil gel. Thereafter, the liquid film was cured by light emitted by an ultraviolet ray irradiaor (SPOT CURE SP5-250DB, manufactured by USHIO INC.) in a light amount of 350 mJ/cm$^2$. A hundred layers were formed and cured in the same manner to manufacture a three-dimensional oil gel object. Thus, the three-dimensional oil gel with a dimension of 20 mm (depth)×20 mm (width)×2 mm (height) free of layer peel-off was obtained.

Figure 15:
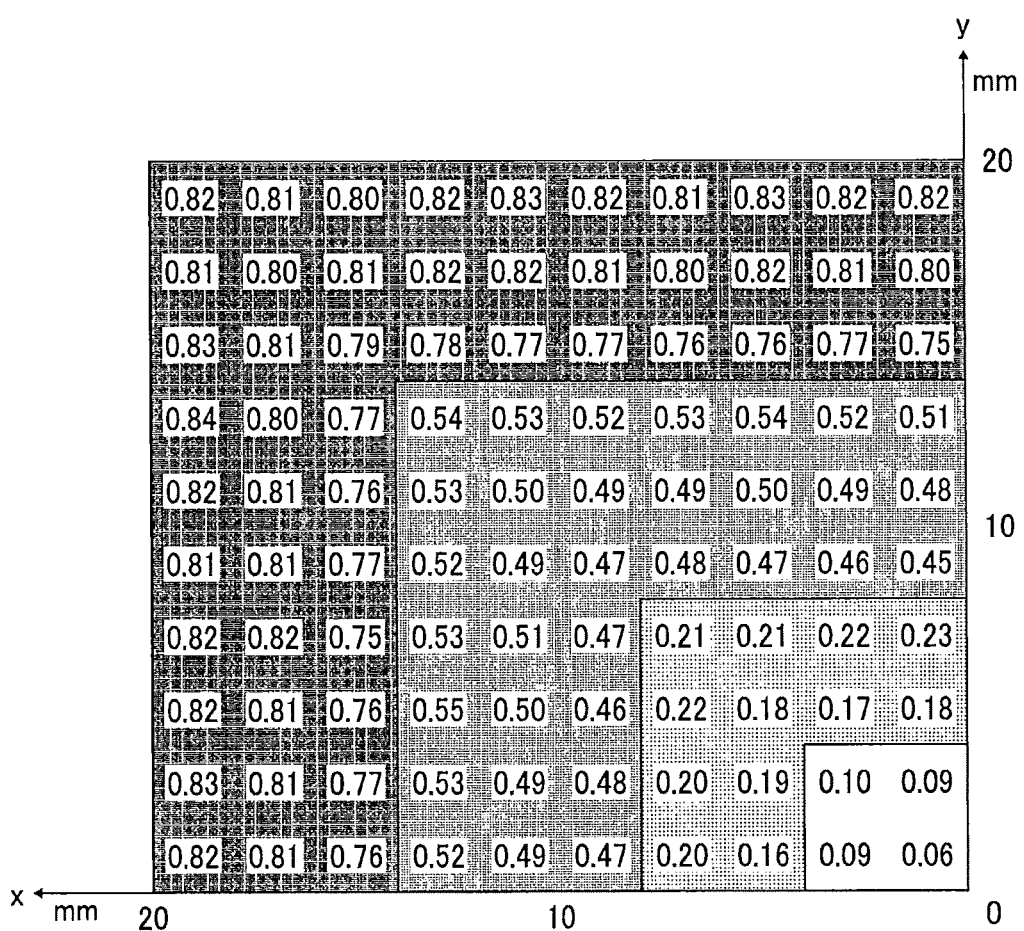
FIG. 15 is a schematic diagram illustrating the modulus of elasticity distribution at 20 percent compression in FIG. 14.

The modulus of elasticity under 20 percent compression of the oil gel was measured in the same manner as described in Example 2. The measuring results are shown in Table 3 and FIG. 15. FIG. 15 is a diagram illustrating the values (MPa) of the modulus of elasticity for each area of 2 mm (depth)×2 mm (width) in the oil gel illustrated in FIG. 14. The area of film of each mass ratio (liquid G:liquid H) of FIG. 14 corresponds to the area of the value of the modulus of elasticity under 20 percent compression in FIG. 15.

It is found that different modulus of elasticity can be obtained by changing the mixing ratio of the liquid G and the liquid H.

Example 10

The liquid G (forming liquid) was used as the first liquid and the liquid I (diluting liquid) was used as the second liquid. The inkjet head (MH5420, manufactured by Ricoh Industry Company, Ltd.) was filled with the liquids and discharged them in the same manner as in Example 2.

Figure 16:
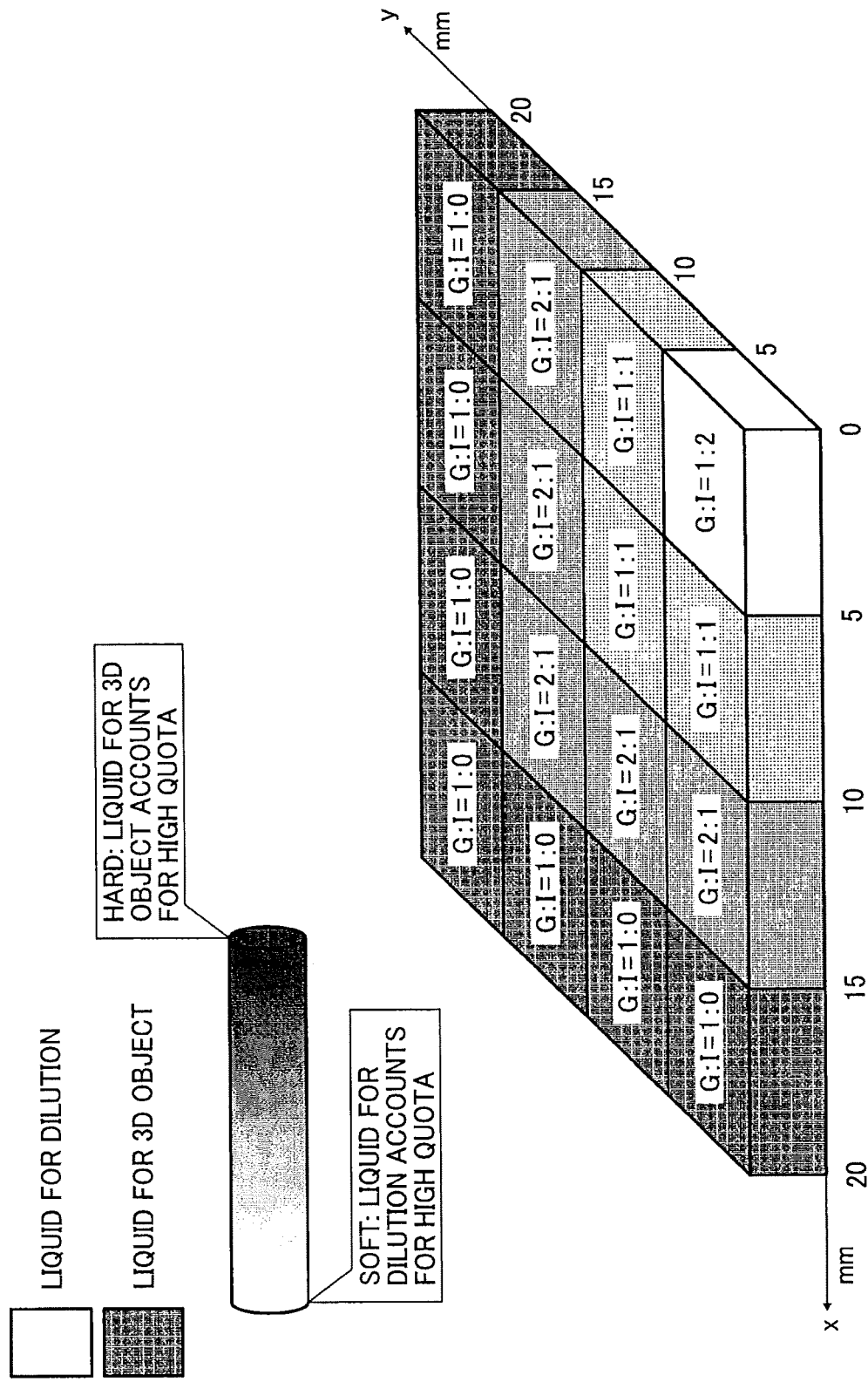
FIG. 16 is a schematic diagram illustrating an example of the mass ratio distribution of the first liquid and the second liquid in the oil gel object (three-dimensional object) of Example 10.

The volume of droplets discharged was changed to change the mass ratio (liquid G:liquid I) as illustrated in FIG. 16 to obtain an oil gel. FIG. 16 is a diagram illustrating the mixing ratio distribution in which the volume of the droplets of the liquid G and the liquid I in a single area in the oil gel.

To be specific, four inkjet heads (MH5420, manufactured by Ricoh Industry Co., Ltd.) were filled with the liquid A and another four inkjet heads were filled with the liquid B to discharge them. The total amount of the liquid imparted on the single area was controlled to be 144 pL. For example, the liquid volume was changed in such a manner that the ratio of the volume of a droplet of the liquid G and the volume of a droplet of the liquid I was 24 pL:120 pL, 48 pL:96 pL, and 72 pL:72 pL to form a liquid film of an oil gel. Thereafter, the liquid film was cured by light emitted by an ultraviolet ray irradiaor (SPOT CURE SP5-250DB, manufactured by USHIO INC.) in a light amount of 350 mJ/cm$^2$. A hundred layers were formed and cured in the same manner to manufacture a three-dimensional oil gel object. Thus, the three-dimensional oil gel with a dimension of 20 mm (depth)×20 mm (width)×2 mm (height) free of layer peel-off was obtained.

Figure 17:
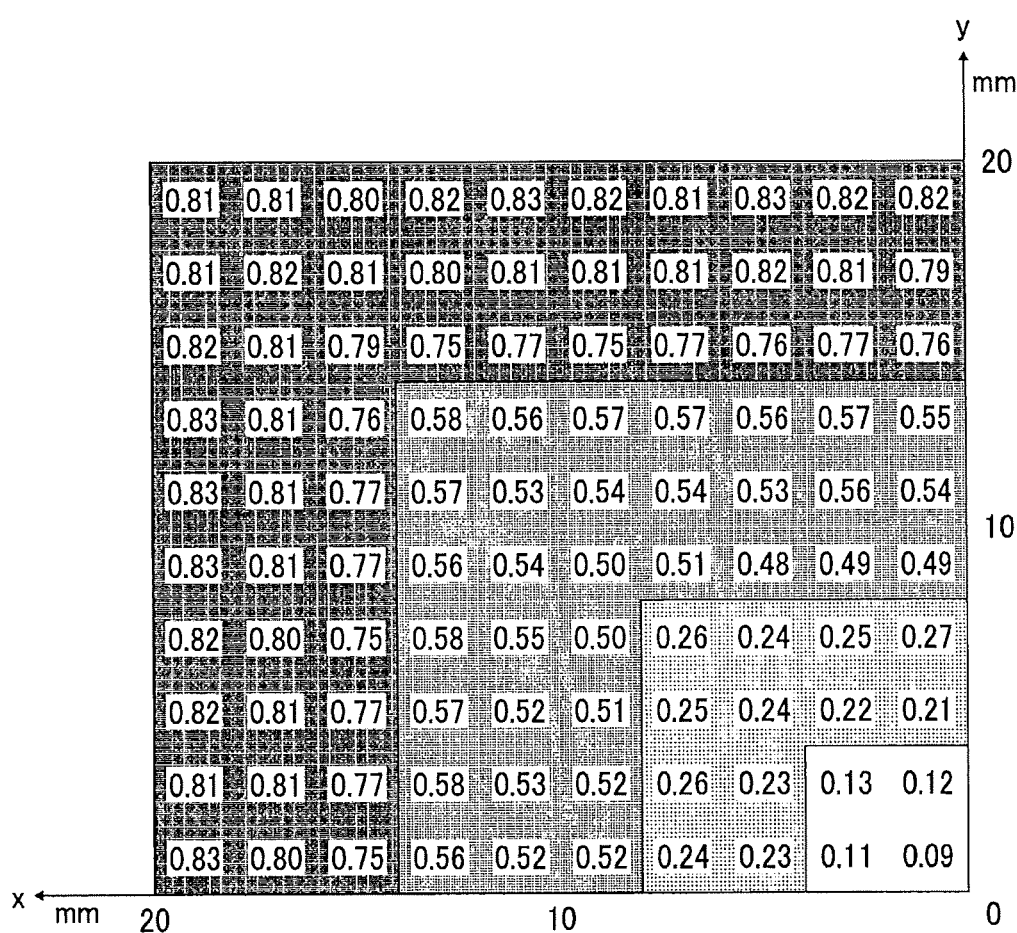
FIG. 17 is a schematic diagram illustrating the modulus of elasticity distribution at 20 percent compression in FIG. 16.

The modulus of elasticity under 20 percent compression of the oil gel was measured in the same manner as described in Example 2. The measuring results are shown in Table 3 and FIG. 17. FIG. 17 is a diagram illustrating the values (MPa) of the modulus of elasticity for each area of 2 mm (depth)×2 mm (width) in the oil gel illustrated in FIG. 16. The area of film of each mass ratio (liquid G:liquid I) of FIG. 16 corresponds to the area of the value of the modulus of elasticity under 20 percent compression in FIG. 17.

It is found that different modulus of elasticity can be obtained by changing the mixing ratio of the liquid G and the liquid I.

The degree of polymerization of the oil gel obtained in the area of the liquid G:the liquid I=1:0 and the area of the liquid G:the liquid I=1:1 was measured by a thermal mass analyzer (Thermoplus TG8120, manufactured by Rigaku Corporation). To be specific, after a cube of 2 mm (depth)×2 mm (width)×2 mm (height) was cut out from the oil gel in the areas, the polymer containing ratio was measured by thermal mass analysis to obtain the degree of polymerization. While the degree of polymerization was 92 percent in the area of the liquid G:the liquid I=1:0, the degree of polymerization was increased to 97 percent in the area of the liquid G:the liquid I=1:1. Therefore, the effect of the thermal polymerization initiator was confirmed.

Comparative Example 1

The liquid A (forming liquid) was used as the first liquid and the liquid B (diluting liquid) was used as the second liquid.

Figure 18:
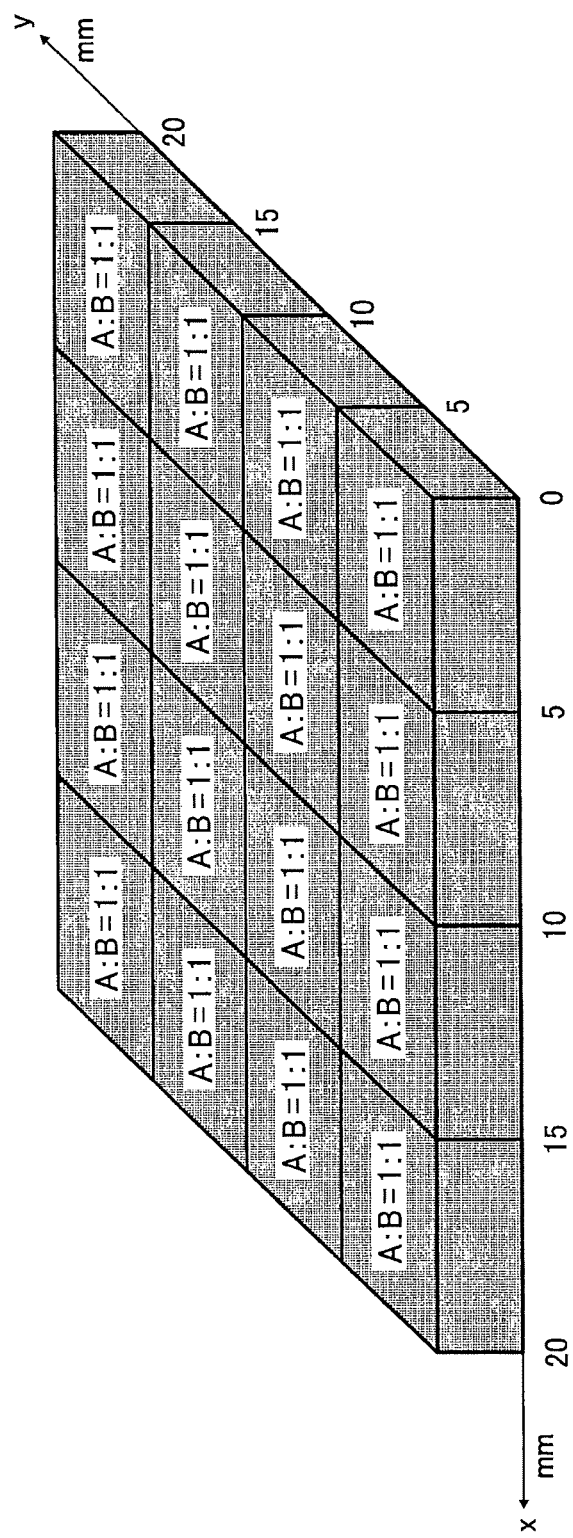
FIG. 18 is a schematic diagram illustrating an example of the mass ratio distribution of the first liquid and the second liquid in the hydrogel object (three-dimensional object) of Comparative Example 1 described later including water as the main ingredient.

The inkjet head (MH5420, manufactured by Ricoh Industry Company, Ltd.) was filled with the liquid A and the liquid B and discharged them in 300 dpi×300 dpi in the same manner as in Example 2. The volume of droplets discharged, that is, the mass ratio (liquid A:liquid B) was set to be 1:1 to manufacture a three-dimensional object (hydrogel object) containing water as the main ingredient. FIG. 18 indicates that the volume ratio of the droplets of the liquid A and the liquid B in a single area in the three-dimensional object (hydrogel object) containing water as the main ingredient is 1:1.

To be specific, four inkjet heads (MH5420, manufactured by Ricoh Industry Co., Ltd.) were filled with the liquid A and another four was filled with the liquid B to discharge both liquids. The total amount of the liquid imparted on the single area was controlled to be 144 pL. The liquid volume was maintained constant in such a manner that the ratio of the volume of a droplet of the liquid A and the volume of a droplet of the liquid B was 72 pL:72 pL to form a liquid film of a three-dimensional object (hydrogel object) containing water as the main ingredient. Thereafter, the liquid film was cured by light emitted by an ultraviolet ray irradiaor (SPOT CURE SP5-250DB, manufactured by USHIO INC.) in a light amount of 350 mJ/cm$^2$. Such a liquid film was formed hundred times and cured in the same manner to manufacture a three-dimensional object (hydrogel object) containing water as the main ingredient. Thus, a hydrogel object containing water as the main ingredient with a dimension of 20 mm (depth)×20 mm (width)×2 mm (height) free of layer peel-off was obtained.

The modulus of elasticity under 20 percent compression of the thus-obtained hydrogel object containing water as the main ingredient was measured in the same manner as in Example 2. The measuring results are shown in Table 3 and FIG. 19.

Figure 19:
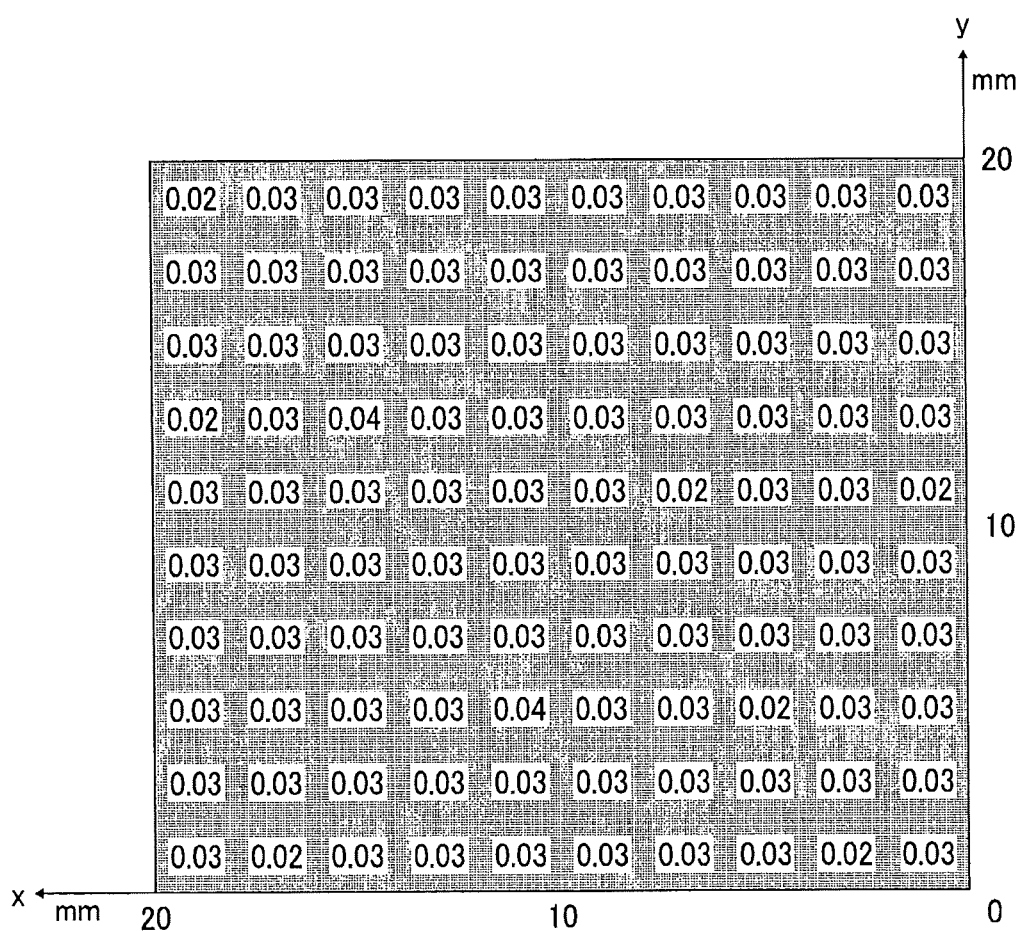
FIG. 19 is a schematic diagram illustrating the modulus of elasticity distribution under 20 percent compression in FIG. 18.

The area of film of each mixing ratio of FIG. 18 corresponds to the area of the value of the modulus of elasticity in FIG. 19.

When the mass ratio (liquid A:liquid B) of the liquid A and the liquid B was kept constant, a uniform three-dimensional object (hydrogel object) containing water as the main ingredient was formed having a uniform 20 percent modulus of elasticity.

Unlike Examples 2 and 3, a three-dimensional object (hydrogel object) containing water as the main ingredient with multiple areas having different values of modulus of elasticity was not formed.

TABLE 3

|  | | First liquid | Second liquid | Mass ratio (first liquid:second liquid) | 20 percent modulus of elasticity (MPa) | 70 percent compression stress (MPa) | 80 percent compression stress (MPa) |
|---|---|---|---|---|---|---|---|
| Example | 1 | liquid A | liquid B | 1:3 | 0.01 | — | — |
|  |  |  |  | 1:2 | 0.03 | — | — |
|  |  |  |  | 1:1 | 0.09-0.10 | — | — |
|  |  |  |  | 2:1 | 0.24-0.26 | — | — |
|  | 2 | liquid A | liquid B | 1:3 | 0.01 | — | — |
|  |  |  |  | 1:2 | 0.02-0.03 | — | — |
|  |  |  |  | 1:1 | 0.03-0.10 | — | — |
|  |  |  |  | 2:1 | 0.13-0.28 | — | — |

TABLE 3-continued

|  | First liquid | Second liquid | Mass ratio (first liquid:second liquid) | 20 percent modulus of elasticity (MPa) | 70 percent compression stress (MPa) | 80 percent compression stress (MPa) |
|---|---|---|---|---|---|---|
| 3 | liquid A | liquid B | 1:3 | 0.01 | — | — |
|  |  |  | 1:1 | 0.03-0.12 | — | — |
|  |  |  | 3:1 | 0.34-0.42 | — | — |
|  |  |  | 4:0 | 0.46-0.57 | — | — |
| 4 | liquid F | liquid B | 1:3 | 0.003-0.004 | — | — |
|  |  |  | 1:2 | 0.007-0.009 | — | — |
|  |  |  | 1:1 | 0.01 | — | — |
|  |  |  | 2:1 | 0.02-0.04 | — | — |
| 5 | liquid A | liquid B | 1:2 | 0.13 | 0.051 | 0.15 |
|  |  |  | 1:1 | 0.27 | 0.18 | 0.49 |
|  |  |  | 2:1 | 0.13 | 0.45 | 1 |
| 6 | liquid C | liquid D | 1:2 | 0.23 | 0.52 | 1.5 |
|  |  |  | 1:1 | 0.18 | 0.44 | 1.2 |
|  |  |  | 2:1 | 0.12 | 0.27 | 0.8 |
| 7 | liquid A | liquid E | 1:2 | 0.12 | 0.26 | 0.9 |
|  |  |  | 1:1 | 0.16 | 0.38 | 1.2 |
|  |  |  | 2:1 | 0.2 | 0.49 | 1.5 |
| 8 | liquid A | liquid B | 1:2 | 0.03-0.08 | — | — |
|  |  |  | 1:1 | 0.20-0.27 | — | — |
|  |  |  | 2:1 | 0.31-0.37 | — | — |
| 9 | liquid G | liquid H | 1:0 | 0.75-0.84 | — | — |
|  |  |  | 2:1 | 0.45-0.55 | — | — |
|  |  |  | 1:1 | 0.16-0.23 | — | — |
|  |  |  | 1:2 | 0.60-0.10 | — | — |
| 10 | liquid G | liquid I | 1:0 | 0.75-0.83 | — | — |
|  |  |  | 2:1 | 0.48-0.58 | — | — |
|  |  |  | 1:1 | 0.21-0.27 | — | — |
|  |  |  | 1:2 | 0.09-0.13 | — | — |
| Comparative Example 1 | liquid A | liquid B | 1:1 | 0.02-0.04 | — | — |

Example 11

Liquid A was used as the first liquid and Liquid B was used as the second liquid.

Like Example 2, the liquid A and the liquid B were laminated in such a manner while forming an area having a mixing ratio (liquid A:liquid B) of 2:1 and an area having a mixing ratio (liquid A:liquid B) of 1:2 to form a three-dimensional object of 20 mm (depth)×20 mm (width)×20 mm (height) using the device illustrated in FIG. 20. The manufacturing conditions are according to Example 2.

Example 12

Figure 23:
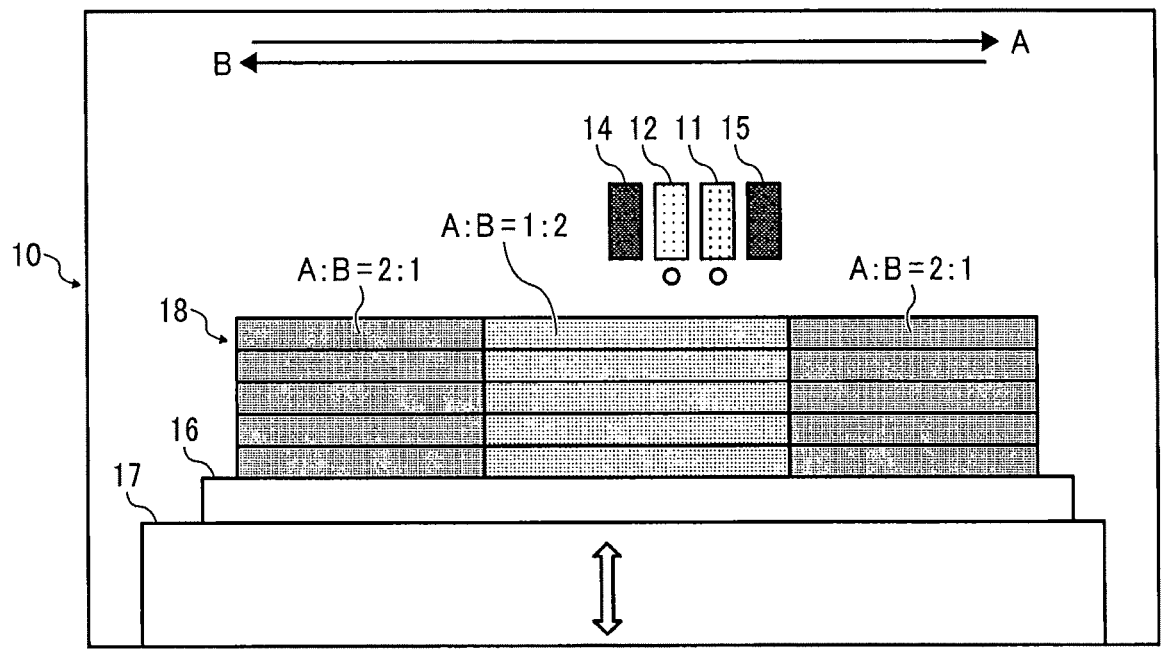
FIG. 23 is a schematic diagram illustrating an example of the device for manufacturing a three-dimensional object for use in the method of manufacturing a three-dimensional object according to an embodiment of the present invention.

A three-dimensional object of 20 mm (depth)×20 mm (width)×20 mm (height) was manufactured in the same manner as in Example 11 using the device illustrated in FIG. 23.

The light source for use in the device illustrated in FIG. 23 was a UV-LED (SubZero-LED 365 nm, manufactured by Integration) and the light amount was adjusted to 350 mJ/cm².

Example 13

A three-dimensional object of 20 mm (depth)×20 mm (width)×20 mm (height) was manufactured in the same manner as in Example 11 using the device illustrated in FIG. 24. In FIG. 24, reference numerals 10, 11, 12, 16, 17, and 18 represent a manufacturing device, an ink jetting head unit for liquid for forming a three-dimensional object, an ink jetting head unit for liquid for dilution, a support substrate to support a three-dimensional object, a stage, and a three-dimensional object, respectively.

The light source for use in the device illustrated in FIG. 24 was a UV-LED (SubZero-LED 365 nm, manufactured by Integration) and the light amount was adjusted to 350 mJ/cm².

The smoothing member was reversely rotated.

The three-dimensional objects of Examples 11 to 13 were evaluated as follows.

Forming Property of Three-Dimensional Object

The form of the entire three-dimensional object and whether there was deficiency in areas having different ingredients were visually checked.

Evaluation Criteria

A: Good

B: Fair

C: Bad

Error in Horizontal Direction and Error in Perpendicular Direction

Figure 26:
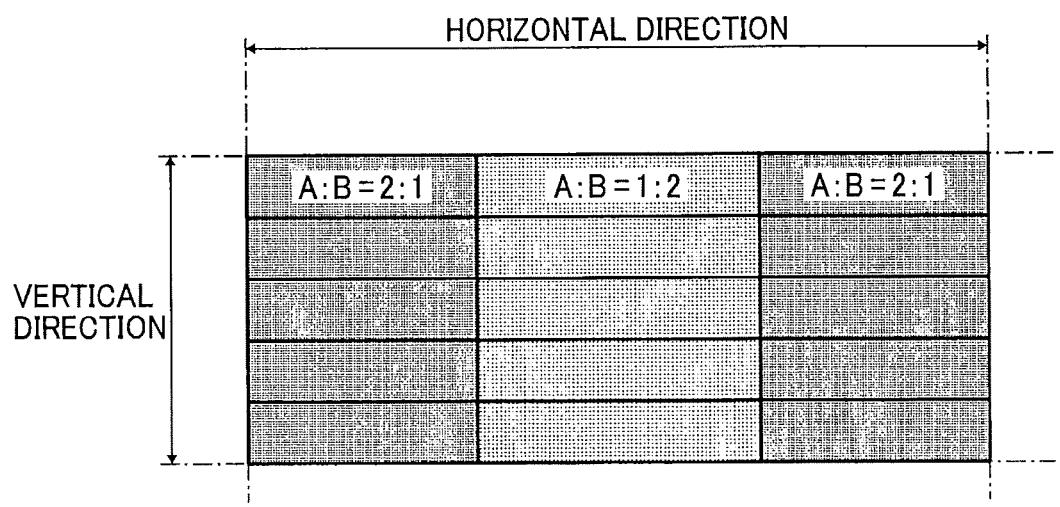
FIG. 26 is a diagram illustrating a method of obtaining a dimension accuracy of a three-dimensional object.

As illustrated in FIG. 26, the dimensions of the three-dimensional object formed in Examples 11 to 13 were measured at 10 positions in the horizontal direction and the perpendicular direction. The degree of deviation of the 10 positions was obtained and evaluated.

Evaluation Criteria

A: Good

B: Fair

C: Bad

TABLE 4

|  | Forming property of three-dimensional object | Error in horizontal direction | Error in perpendicular direction |
|---|---|---|---|
| Example 11 | A | B to A | B |
| Example 12 | A | A | B |
| Example 13 | A | A | A |

Example 14

Liquid A was used as the first liquid and Liquid B was used as the second liquid.

Figure 27:
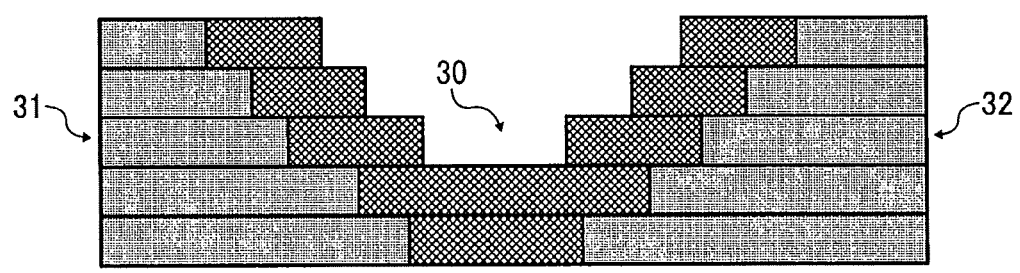
FIG. 27 is a diagram illustrating a state in which the three-dimensional object is supported by a support structure.

The three-dimensional object and the support structure illustrated in FIG. 27 were formed using the device illustrated in FIG. 23.

The area of the three-dimensional object was formed with the mixing ratio of the liquid A and the liquid B of 2:1 and the area of the support structure was formed with the mixing ratio of the liquid A and the liquid B of 1:5.

When forming the support structure, the area thereof kept at least minimal strength to support the three-dimensional object.

Figure 28:
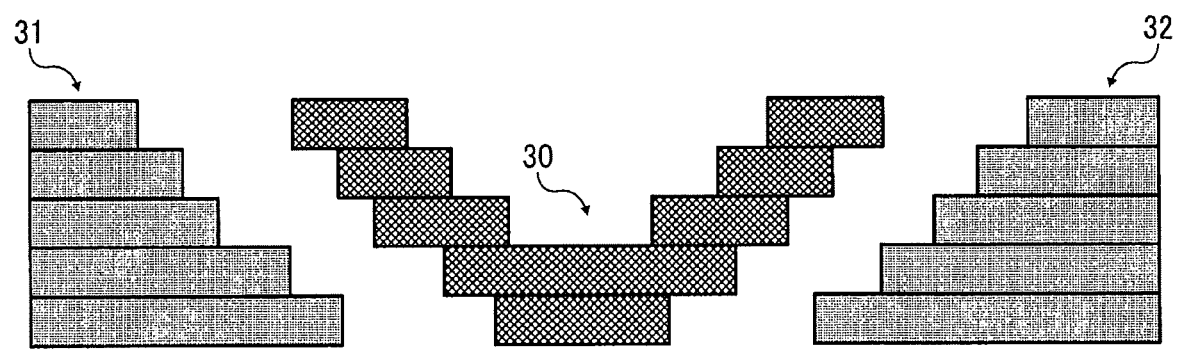
FIG. 28 is a diagram illustrating a state in which the three-dimensional object is separated from the support structure.

After the forming, as illustrated in FIG. 28, the three-dimensional object 30 was taken out while breaking the support structures 31 and 32 to separate it from the three-dimensional object.

Embodiments of the present disclosure are, for example, as follows.

1. A method of manufacturing a three-dimensional object includes imparting a first liquid having a first composition including a solvent and a curable material and a second liquid having a second composition to form a liquid film, curing the liquid film and repeating the imparting and the curing to obtain the three-dimensional object, wherein the imparting position and the imparting amount of each of the first liquid and the second liquid are controlled in such a manner that the liquid film includes multiple areas where post-curing compression stress and/or post-curing modulus of elasticity are different.

2. The method according to 1 mentioned above, wherein the imparting position of the first liquid matches the imparting position of the second liquid.

3. The method according to 1 or 2 mentioned above, wherein the first liquid and the second liquid are imparted in a liquid discharging method.

4. The method according to any one of 1 to 3 mentioned above, wherein the imparting amount of the first liquid and the imparting amount of the second liquid are controlled based on the volume of a droplet or the number of droplets to be imparted.

5. The method according to any one of 1 to 4 mentioned above, wherein the second liquid includes no curable material.

6. The method according to any one of 1 to 5 mentioned above, wherein the imparting position and the imparting amount of each of the first liquid and the second liquid are controlled to further form a support structure to support the three-dimensional object.

7. A liquid set for manufacturing a three-dimensional object includes a first liquid having a first composition including a solvent and a curable material and a second liquid having a second composition.

8. The liquid set according to 7 mentioned above, wherein the solvent includes water, the curable material includes a polymerizable monomer, and the first liquid further includes a mineral.

9. The liquid set according to 7 or 8 mentioned above, wherein the second liquid includes at least one of a cross-linking agent and a mineral.

10. The liquid set according to any one of 7 to 9 mentioned above, wherein at least one of the first liquid and the second liquid includes a polymerization initiator.

11. The liquid set according to any one of 7 to 10 mentioned above, wherein the second liquid includes a different polymerizable monomer from the polymerizable monomer included in the first liquid.

12. The liquid set in any one of 7 to 10 mentioned above, wherein the second liquid includes the same polymerizable monomer as the polymerizable monomer included in the first liquid.

13. The liquid set according to any one of 7 to 10 mentioned above, wherein the second liquid includes no curable material.

14. The liquid set according to any one of 7 to 13 mentioned above, further comprising a third liquid having a third composition.

15. A method of manufacturing a three-dimensional object includes imparting the first liquid and the second liquid of the liquid set of any one of 7 to 13 mentioned above to form a liquid film and curing the liquid film.

16. A device for manufacturing a three-dimensional object includes an imparting device to impart the first liquid and the second liquid of the liquid set of any one of 7 to 13 mentioned above to form a liquid film and a curing device to cure the liquid film.

17. The device according to 16 mentioned above, wherein the curing device includes an ultraviolet light-emitting diode.

18. The device according to 16 or 17 mentioned above, further including a smoothing device to smooth the liquid film cured.

19. A gel object includes a solvent and a polymer, wherein at least one of 80 percent compressive stress-strain and modulus of elasticity has a continuous gradient.

20. The gel object according to 19 mentioned above, wherein 80 percent compressive stress-strain is 10-10,000 kPa.

According to the present invention, the method of manufacturing a three-dimensional object capable of simply and efficiently manufacturing a three-dimensional object having multiple areas where compression stress and modulus of elasticity are different.

Having now fully described embodiments of the present invention, it will be apparent to one of ordinary skill in the art that many changes and modifications can be made thereto without departing from the spirit and scope of embodiments of the invention as set forth herein.

What is claimed is:

1. A method of manufacturing a three-dimensional object, comprising:
discharging onto a stage a first liquid for forming the three-dimensional object from a first discharging head, a second liquid for forming the three-dimensional object from a second discharging head, and a third liquid for forming a support structure from a third discharging head, such that the discharged first and second liquids are mixed on the stage and multiple areas having different mixing ratios of the first and second liquids are formed on the stage, and that the third liquid is imparted to a site where the first liquid or the second liquid is not imparted,
wherein
the first liquid comprises water, a curable material, and a polymerization initiator,
the second liquid comprises a solvent to dilute the first liquid, and
the third liquid is free of water and has a composition different from compositions of the first liquid and second liquid;
curing the mixtures of the first and second liquids, and the third liquid, on the stage;

repeating the discharging and the curing to obtain the three-dimensional object that is supported by the support structure; and removing the support structure from the three-dimensional object, wherein after the curing, the multiple areas having different mixing ratios of the first and second liquids have different compression stress, modulus of elasticity, or both.

2. The method according to claim 1, wherein an amount of the first liquid discharged from the first discharging head and an amount of the second liquid discharged from the second discharging head are controlled based on a volume of a droplet or a number of droplets discharged from the first or second discharging head.

3. The method according to claim 1, wherein the second liquid is free of a curable material.

4. The method according to claim 1, wherein the curable material in the first liquid is acryloyl morpholine.

5. The method according to claim 3, wherein the curable material in the first liquid is acryloyl morpholine.

6. A method of manufacturing a three-dimensional object, comprising:

discharging onto a stage a first liquid for forming the three-dimensional object from a first discharging head and a second liquid for forming the three-dimensional object from a second discharging head, and a third liquid for forming a support structure from a third discharging head, such that the discharged first and second liquids are mixed on the stage and that a liquid film having multiple areas having different mixing ratios of the first and second liquids are formed on the stage, and that the third liquid is imparted to a site where the first liquid or the second liquid is not imparted;

where the first liquid comprises water, a curable material, and a polymerization initiator, and the second liquid comprises a solvent to dilute the first liquid; and the third liquid is free of water and has a composition different from compositions of the first liquid and second liquid;

curing the liquid film and the third liquid, on the stage; and repeating the discharging and the curing to obtain the three-dimensional object that is supported by the support structure, removing the support structure form the three-dimensional object wherein 80 percent compressive stress-strain, modulus of elasticity, or both, of the three-dimensional object has a continuous gradient, and the three-dimensional object is an internal organ model.

7. The method according to claim 1, wherein the first liquid further comprises a mineral.

8. The method according to claim 1, wherein the first liquid further comprises a cross-linking agent.

9. The method according to claim 1, wherein in the discharging, the first, second, and third liquids are discharged directly onto the stage.

10. The method according to claim 1, wherein the repeating of the discharging and the curing is performed such that the first, second, and third liquid are discharged on a cured first, second, and third liquids on the stage.

11. The method according to claim 1, wherein the repeating of the discharging and the curing is performed such that the obtained three-dimensional object is a laminate of layers obtained by curing the first and second liquids in the curing.

12. The method according to claim 1, wherein the discharging is performed such that at least four areas having different mixing ratios of the first and second liquids are formed on the stage, and after the curing, the at least four areas having different mixing ratios of the first and second liquids have different compression stress, modulus of elasticity, or both.

13. The method according to claim 1, wherein the discharging is performed by using a device having a discharging head consisting of the first discharging head, the second discharging head, and the third discharging head.

14. The method according to claim 1, wherein the three-dimensional object is an internal organ model.

* * * * *